US012709009B2

(12) United States Patent
Tozeto Ramos et al.

(10) Patent No.: US 12,709,009 B2
(45) Date of Patent: Aug. 18, 2026

(54) SIMULATION-BASED CONTROL OF AUTONOMOUS DEVICES

(71) Applicant: NVIDIA Corporation, Santa Clara, CA (US)

(72) Inventors: Fabio Tozeto Ramos, Seattle, WA (US); Dieter Fox, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 490 days.

(21) Appl. No.: 16/417,540

(22) Filed: May 20, 2019

(65) Prior Publication Data

US 2020/0368906 A1 Nov. 26, 2020

(51) Int. Cl.
*B25J 9/16* (2006.01)
*G05B 13/04* (2006.01)
(Continued)

(52) U.S. Cl.
CPC ............ *B25J 9/1671* (2013.01); *B25J 9/163* (2013.01); *G05B 13/042* (2013.01); *G06N 7/01* (2023.01);
(Continued)

(58) Field of Classification Search
CPC ........ B25J 9/1671; B25J 9/163; B25J 9/1605; B25J 9/1661; G05B 13/042;
(Continued)

(56) References Cited

U.S. PATENT DOCUMENTS 9,805,158 B1 * 10/2017 Liu ........................ G06F 30/398
2005/0275660 A1 * 12/2005 Keller ...................... G06T 15/55 345/613

(Continued)

FOREIGN PATENT DOCUMENTS

CN 101278293 A 10/2008
CN 104459691 A 3/2015

OTHER PUBLICATIONS

Papamakarios et al., "Fast epsilon-free Inference of Simulation Models with Bayesian Conditional Density Estimation", Revised Apr. 2, 2018, School of Informatics University of Edinburgh, https://arxiv.org/pdf/1605.06376.pdf (Year: 2018).*

(Continued)

*Primary Examiner* — Khoi H Tran
*Assistant Examiner* — Tanner L Cullen
(74) *Attorney, Agent, or Firm* — Davis Wright Tremaine LLP

(57) ABSTRACT

In an embodiment, a system calculates a distribution of possible parameters for a simulation that cause the simulation to match a measured behavior in the real world. In an embodiment, the system selects a plurality of simulation parameters based on a statistical distribution that represents an initial estimate of possible parameter values. In an embodiment, using the results produced by the simulation, an updated distribution of possible parameters is constructed based on a density of the results modeled using Fourier features. In an embodiment, the updated distribution of possible parameters can be used to select a particular set of parameters for the simulation, which cause the simulator to approximate the measured behavior.

25 Claims, 20 Drawing Sheets

(51) Int. Cl.
*G06F 17/18* (2006.01)
*G06N 7/01* (2023.01)

(52) U.S. Cl.
CPC .... *G05B 2219/50391* (2013.01); *G06F 17/18* (2013.01)

(58) Field of Classification Search
CPC ......... G05B 2219/50391; G06N 7/005; G06N 3/084; G06N 3/006; G05D 1/0221; G06F 17/18; G06K 9/6226
See application file for complete search history.

(56) References Cited

U.S. PATENT DOCUMENTS

| | | | | |
|---|---|---|---|---|
| 2014/0149325 | A1* | 5/2014 | Clifton | A61B 5/0205 706/12 |
| 2014/0279819 | A1* | 9/2014 | Macaro | G06F 17/18 706/52 |
| 2015/0227837 | A1* | 8/2015 | Clifton | G06N 7/005 706/52 |
| 2017/0262572 | A1* | 9/2017 | Mori | G05B 13/044 |
| 2018/0210413 | A1* | 7/2018 | Frangos | E21B 21/08 |
| 2019/0129436 | A1 | 5/2019 | Sun et al. | |
| 2020/0202057 | A1* | 6/2020 | Chen | G06N 7/005 |
| 2020/0218999 | A1* | 7/2020 | Eleftheriadis | G06Q 10/04 |
| 2020/0250586 | A1* | 8/2020 | Kajihara | G06N 7/005 |
| 2020/0293594 | A1* | 9/2020 | Raissi | G06N 20/10 |
| 2021/0078168 | A1* | 3/2021 | Mehnert | G05D 1/021 |
| 2021/0122038 | A1* | 4/2021 | Bischoff | B25J 9/163 |

OTHER PUBLICATIONS

Chebotar et al., “Closing the Sim-to-Real Loop: Adapting Simulation Randomization with Real World Experience”, Revised Mar. 5, 2019, 2019 International Conference on Robotics and Automation (ICRA), https://arxiv.org/pdf/1810.05687.pdf (Year: 2019).*
Tobin et al. “Domain Randomization for Transferring Deep Neural Networks from Simulation to the Real World”, Mar. 20, 2017, 2017 IEEE/RSJ International Conference on Intelligent Robots and Systems (IROS 2017), https://arxiv.org/pdf/1703.06907.pdf (Year: 2017).*
Gandhi et al., “Pseudospectral Model Predictive Control under Partially Learned Dynamics”, Oct. 12, 2018, Georgia Institute of Technology, Atlanta, Georgia, https://arxiv.org/abs/1702.04800 (Year: 2018).*
Shahriari et al., Taking the Human Out of the Loop: A Review of Bayesian Optimization, Dec. 10, 2015, Proceedings of the IEEE, vol. 104, Issue: 1, pp. 148-175, https://ieeexplore.ieee.org/document/7352306?source=IQplus (Year: 2015).*
Milton et al., “Spatial Analysis Made Easy with Linear Regression and Kernels”, Feb. 26, 2019, MRC Centre for Outbreak Analysis and Modelling Department of Infectious Disease Epidemiology Imperial College London, London, UK, https://arxiv.org/abs/1902.08679 (Year: 2019).*
Marmin et al., “Variational Calibration of Computer Models”, Oct. 29, 2018, Department of Data Science, EURECOM, France, pp. 1-13, https://arxiv.org/abs/1810.12177 (Year: 2018).*
McCalman, “Multi-Modal Estimation with Kernel Embeddings for Learning Motion Models”, 2013 IEEE International Conference on Robotics and Automation, May 6-10, 2013, pp. 2845-2852, https://ieeexplore.ieee.org/document/6630971?source=IQplus (Year: 2013).*
Article 67(3) EPC Communication mailed Oct. 28, 2020, European Patent Application No. 20167977.6, 2 pages.
Chebotar et al., “Closing the Sim-to-Real Loop: Adapting Simulation Randomization with Real World Experience,” 2019 IEEE International Conference on Robotics and Automation (ICRA), May 20, 2019, 9 pages.
Communication Pursuant to Rule 69 EPC, mailed Nov. 30, 2020, European Patent Application No. 20167977.6, 2 pages.
Extended European Search Report mailed Oct. 2, 2020, European Patent Application No. 20167977.6, 11 pages.
IEEE Computer Society, “IEEE Standard 754-2008 (Revision of IEEE Standard 754-1985): IEEE Standard for Floating-Point Arithmetic,” The Institute of Electrical and Electronics Engineers, Inc., Aug. 29, 2008, 70 pages.
Papamakarios et al., “Fast epsilon-free Inference of Simulation Models with Bayesian Conditional Density Estimation,” May 20, 2016, retrieved Jan. 14, 2021 from https://arxiv.org/pdf/1605.06376.pdf, 16 pages.
Paul et al., “Fingerprint Policy Optimisation for Robust Reinforcement Learning,” Sep. 15, 2018, retrieved Jan. 21, 2021 from https://arxiv.org/pdf/1805.10662v2.pdf, 12 pages.
Peng et al., “Sim-to-Real Transfer of Robotic Control with Dynamics Randomization,” Oct. 18, 2017, retrieved Jan. 21, 2021 from https://arxiv.org/pdf/1710.06537.pdf, 8 pages.
Ramos et al., “BayesSim: adaptive domain randomization via probabilistic inference for robotics simulators,” Jun. 4, 2019, retrieved Jan. 21, 2021 from https://arxiv.org/pdf/1906.01728.pdf, 10 pages.
Ruiz et al., “Learning To Simulate,” Oct. 5, 2018, retrieved Jan. 14, 2021 from https://arxiv.org/pdf/1810.02513.pdf, 12 pages.
Shuhua et al., “Intelligent Model Learning Based on Variance for Bayesian Reinforcement Learning,” 2015 IEEE 27th International Conference on Tools with Artificial Intelligence (ICTAI), Nov. 9, 2015, 8 pages.
Andrychowicz et al., “HindSight Experience Replay,” Advances in Neural Information Processing Systems, 2017, 11 pages.
Andrychowicz et al., “Learning Dexterous In-Hand Manipulation,” Aug. 28, 2018, 27 pages.
Avron et al., “Quasi-monte Carlo Feature Maps for Shift-Invariant Kernels,” Journal of Machine Learning Research, 17(120): 2016, 38 pages.
Beaumont et al., “Approximate Bayesian Computation in Population Genetics,” Genetics, 4(162): 2002, 12 pages.
Bishop et al., “Mixture Density Networks,” Technical Report, Citeseer, Feb. 1994, 26 pages.
Bonassi et al., “Sequential Monte Carlo with Adaptive Weights for Approximate Bayesian Computation,” Bayesian Analysis, 10(1): 2015, 17 pages.
Braaten et al., “An Improved Low-Discrepancy Sequence for Multidimensional Quasi-Monte Carlo Integration,” Journal of Computational Physics, 33, Nov. 1979, 10 pages.
Brockman et al., “OpenAI Gym,” Jun. 5, 2016, 4 pages.
Diggle et al., “Monte Carlo Methods of Inference for Implicit Statistical Models,” Journal of the Royal Statistical Society, Series B (Methodological), (46)2: 1984, 20 pages.
Gihman et al., “The Theory of Stochastic Processes,” vol. 1, Springer Verlag, Berlin, 1974, 587 pages.
Goodwin et al., “Dynamic System Identification: Experiment Design and Data Analysis,” Academic Press, 1977, 6 pages.
Gourieroux et al., “Indirect Inference,” Journal of Applied Econometrics, 8(S1):S85-S118, 1993, 34 pages.
Lillicrap et al., “Continuous Control with Deep Reinforcement Learning,” Nov. 18, 2015, 14 pages.
Lin, “Self-Improving Reactive Agents Based on Reinforcement Learning, Planning and Teaching,” Machine learning, 8(3-4): 1992, 29 pages.
Marjoram et al., “Markov Chain Monte Carlo without Likelihoods,” Proceedings of the National Academy of Sciences, 100(26): 2003, 5 pages.
Mnih et al., “Human-level Control through Deep Reinforcement Learning,” Nature, 2015, 13 pages.
Mordatch et al., “Ensemble-CIO: Full-body Dynamic Motion Planning that Transfers to Physical Humanoids,” In Intelligent Robots and Systems, 2015, 8 pages.
Pritchard et al., “Population Growth of Human Y Chromosomes: A Study of Y Chromosome Microsatellites,” Molecular Biology and Evolution, 16(12): 1999, 8 pages.
Rahimi et al., “Random Features for Largescale Kernel Machines,” Advances in neural information Processing Systems, 2008, 8 pages.
Rasmussen et al., “Gaussian Processes for Machine Learning (Adaptive Computation and Machine Learning)” The MIT Press, 2005, 266 pages.

(56) References Cited

OTHER PUBLICATIONS

Schafer et al., "Likelihood-Free Inference in Cosmology: Potential for the Estimation of Luminosity Functions," Statistical Challenges in Modern Astronomy V, Springer, 2012, 17 pages.
Schaul et al., "Prioritized Experience Replay," Nov. 19, 2015, 23 pages.
Schaul et al., "Universal Value Function Approximators," 2015, 9 pages.
Schulman et al., "Proximal Policy Optimization Algorithms," Jul. 20, 2017, 12 pages.
Schulman et al., "Trust Region Policy Optimization," International Conference on Machine Learning, 2015, 9 pages.
Sisson et al., "Sequential Monte Carlo without Likelihoods," Proceedings of the National Academy of Sciences, 104(6): 2007, 30 pages.
Stein, "Interpolation of Spatial Data," Springer-Verlag, New york, 1999, 263 pages.
Tan et al., "Sim-to-real: Learning Agile Locomotion for Quadruped Robots," CoRL, 2018, 11 pages.
Tobin et al., "Domain Randomization for Transferring Deep Neural Networks from Simulation to the Real World," IEEE/RSJ International Conference on Intelligent Robots and Systems (IROS), Mar. 20, 2017, pp. 23-30.
Todorov et al., "MuJoCo : A Physics Engine for Model-Based Control," 2012, 8 pages.
Tremblay et al., "Deep Object Pose Estimation for Semantic Robotic Grasping of Household Objects," Conference on Robot Learning, Sep. 27, 2018, 11 pages.
Wilkinson, "Stochastic Modelling for Systems Biology, Second Edition," Chapman & Hall/CRC Mathematical and Computational Biology. Taylor & Francis, 2011, 4 pages.
Office Action for Chinese Application No. 202010425806.0, mailed Nov. 26, 2024, 17 pages.
Office Action for Chinese Application No. 202010425806.0, mailed Jul. 31, 2024, 20 pages.
Office Action for Chinese Application No. 202010425806.0, mailed Nov. 29, 2023, 9 pages.
Office Action for European Application No. 20167977.6, mailed Mar. 15, 2023, 9 pages.
Office Action for European Patent Application No. 20167977.6, mailed Sep. 24, 2025, 9 pages.

* cited by examiner

500

800

| Problem | Parameter | Uniform prior | Rejection ABC | $\epsilon$-Free | RFF | NN |
|---|---|---|---|---|---|---|
| CartPole | pole length | [0.1, 2.0] | -0.342±0.15 | **-0.211±0.07** | -0.609±0.39 | -0.657±0.25 |
| | pole mass | [0.1, 2.0] | 0.032±0.21 | 0.056±0.14 | **0.973±0.26** | 0.633±0.52 |
| Pendulum | dt | [0.01, 0.3] | 2.101±1.04 | 2.307±0.84 | 3.192±0.30 | **3.199±0.17** |
| Mountain Car | power | [0.0005, 0.1] | 3.69±1.21 | 3.800±1.06 | 3.863±0.52 | **3.901±0.2** |
| Acrobot | link mass 1 | [0.5, 2.0] | 1.704±0.82 | 1.883±0.79 | **2.046±0.37** | 1.331±0.22 |
| | link mass 2 | [0.5, 2.0] | 1.832±0.93 | **2.237±0.76** | 0.321±1.85 | 1.513±0.39 |
| | link length 1 | [0.1, 1.5] | **2.421±0.75** | 2.135±0.50 | 2.072±0.76 | 1.856±0.18 |
| | link length 2 | [0.5, 1.5] | -0.521±0.36 | -0.703±0.16 | **-0.148±0.19** | -0.672±0.09 |
| Hopper | lateral friction | [0.3, 0.5] | 3.032±0.43 | 3.154±0.81 | 2.2622±0.64 | **3.391±0.08** |
| Fetch Push | friction | [0.1, 1.0] | 1.332±0.54 | 2.013±0.09 | **2.423±0.07** | 2.404±0.05 |
| Fetch Slide | friction | [0.1, 1.0] | 1.014±0.38 | 1.614±0.12 | **2.391±0.06** | 2.111±0.03 |

FIG. 8

SIMULATION-BASED CONTROL OF AUTONOMOUS DEVICES

BACKGROUND

Simulators are an important tool used for developing technology and scientific discovery. For example, simulators may be used to perform training of a machine learning system such as an autonomous vehicle control system or image recognition system. They are also useful in natural sciences such as cosmology and biology where they are used to model natural phenomena. Using a simulator allows such systems to be trained in a quick and cost-effective manner as it reduces reliance on data collected from the real world. However, the usefulness of a simulator may be limited by the accuracy of the simulator with respect to the real world. If a simulation does not accurately represent the real world, conclusions drawn based on the results of the simulation may be flawed or fail when applied to the real world. Many simulations are governed by a set of parameters. For example, a simulator that models a mechanical system may be governed by parameters such as gravity, friction, air resistance, and mass and dimensional parameters of various objects being simulated. Unfortunately, in some cases, lack of knowledge about the correct simulation parameters, oversimplified simulation models, or insufficient numerical precision for differential equation solvers may prevent the results of a simulation from being seamlessly transferable to the real-world systems.

BRIEF DESCRIPTION OF THE DRAWINGS

Various techniques will be described with reference to the drawings, in which:

FIG. 8 illustrates a variety of log-predicted probabilities for various methods and problems, in accordance with an embodiment;

DETAILED DESCRIPTION

Figure 1:
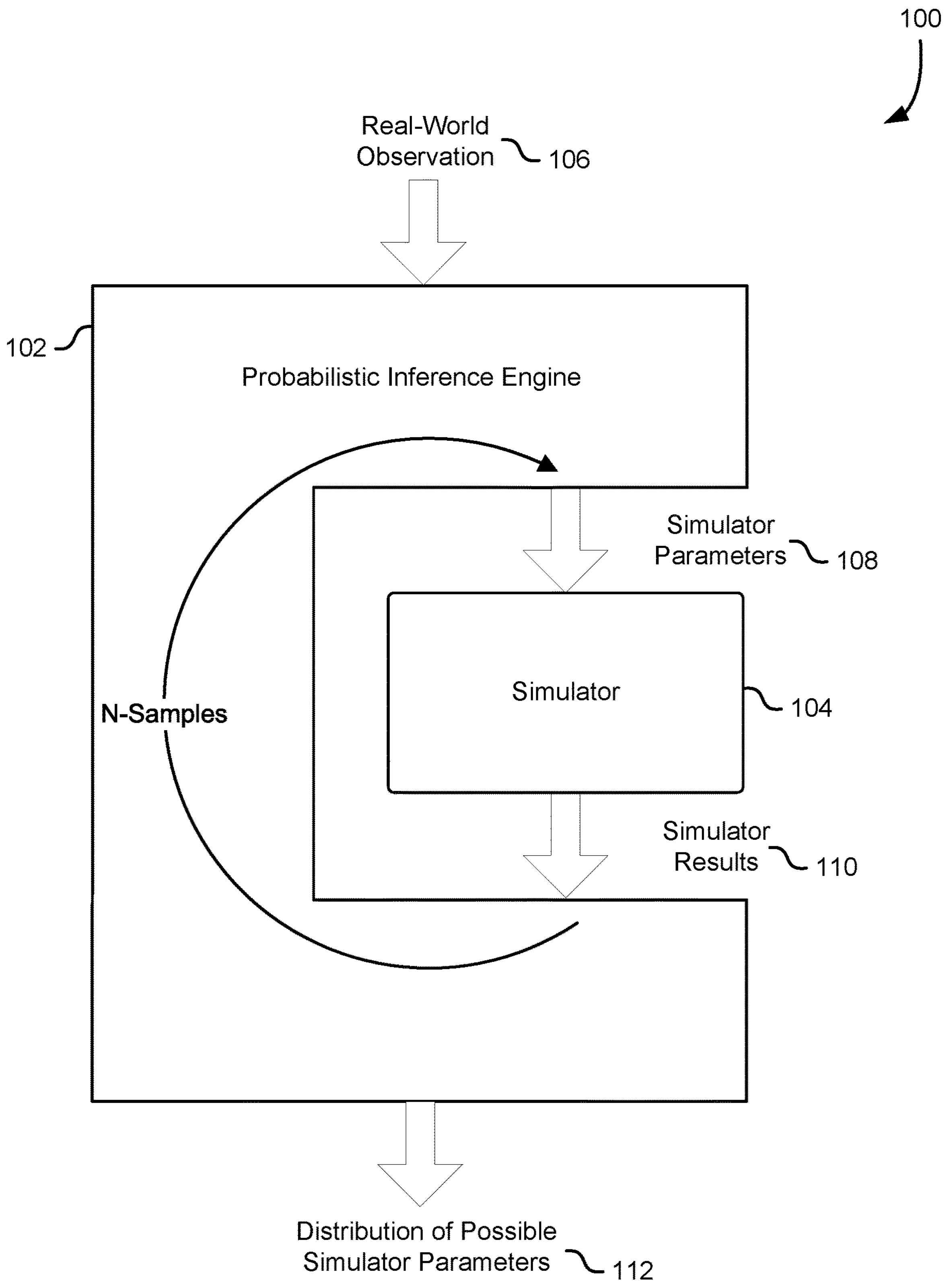
FIG. 1 illustrates an example of a probabilistic inference harness that determines a distribution of possible simulation parameters that reproduce a real-world observation, in accordance with an embodiment.

The present document describes a system and method to determine the parameters of a simulation that, when applied, cause the simulation to approximate an observed real-world result. In an embodiment, a parameter is a value that governs the operation of a simulation. For example, in an embodiment, the Bayesian inferencing techniques described herein can be used to estimate the parameters of a simulated cart-pole balancing problem where a wheeled cart is moved back and forth on a flat surface under computer control. In an embodiment, a pole is connected to the cart using a pivot, and the goal is for a control system to move the cart in a way that keeps the pole balanced in an upright position. In an embodiment, for the cart-pole problem, the simulation is governed by the length and mass of the pole and, in some examples, additional parameters for friction and air resistance.

In an embodiment, the system observes an attempt at the real-world task (such as the cart-pole problem), and attempts to determine a set of parameters that cause the simulation to approximately match the observation. In an embodiment, the system generates a statistical distribution of possible parameters which can, for example, indicate more than one solution if more than one solution exists. In an embodiment, in the cart-pole problem, for example, the Bayesian inferencing techniques described herein can identify a non-Gaussian posterior distribution of possible parameters that suggests that multiple combinations of pole length and pole mass may produce the observed result.

In an embodiment, producing the distribution of possible parameters is made more challenging because the internals of the simulator are not easily accessible. In an embodiment, the simulation produces results (observations) given a set of parameters, and not the inverse, but the Bayesian inferencing techniques described herein determine a distribution of possible parameters that produce a given output notwithstanding this restriction by sampling a plurality of parameter-output pairs from the simulator. In an embodiment, the samples are selected based at least in part on a "best guess" distribution of possible parameters sometimes called a prior. In an embodiment, for example, the prior may be a constant value, or a constant over a possible range. In an embodiment, the prior may be based on a previously determined distribution of simulation parameters.

In an embodiment, the samples are converted to a distribution that represents the relationship between a particular simulator output and the simulation parameters. In an embodiment, the Bayesian inferencing techniques described herein determine the distribution of parameters by modeling the posterior of the simulation parameters. In an embodiment, the density represents the desired distribution of the parameters. In an embodiment, the density is parametrized by a set of Fourier features, which is shown to provide a more accurate distribution of the parameter value, as illustrated by the experimental results provided in the present document.

In an embodiment, as simulators become more sophisticated and able to represent the dynamics of an environment more accurately, fundamental problems in robotics such as motion planning and perception may be solved in simulation and solutions transferred to a physical robot. However, in an embodiment, a simulator might still not be able to represent reality in some respects either due to inaccurate parametrization or simplistic assumptions in the dynamic models. In an embodiment, the system and methods described herein provide a statistical framework to reason about the uncertainty of simulation parameters. In an embodiment, given a black-box simulator (or generative model) that outputs trajectories of state and action pairs from unknown simulation parameters, followed by trajectories obtained with a physical robot the Bayesian inferencing techniques described herein are able to develop a likelihood-free inference method that computes the posterior distribution of simulation parameters. In an embodiment, the posterior is used in domain randomization to train a new policy that performs more consistently near the actual values.

In an embodiment, likelihood-free Bayesian inference is applied to estimating the parameters of a robotics simulator. In an embodiment the Bayesian inferencing techniques described herein provide a full distribution, therefore quantifying the uncertainty of the simulator with respect to reality. In an embodiment, as part of the methodology to perform Bayesian inference from robotics simulators, the Bayesian inferencing techniques described herein provide a regression model that uses random Fourier features ("RFF") and a mixture of distributions to capture multi-modal properties of a problem. In an embodiment, the Bayesian inferencing techniques train policies, aka controllers, by randomizing over the posterior distribution as opposed to the prior. In various embodiments, this provides policies that perform better in the actual environment.

As one skilled in the art will appreciate in light of this disclosure, certain embodiments may be capable of achieving certain advantages, including some or all of the following: (1) By providing a distribution over the simulation parameter, the Bayesian inferencing techniques described herein quantify the uncertainty of the simulator in representing reality, thereby allowing identification of components of a simulator that need to be further developed; (2) Through domain randomization where realizations of the simulation are generated from different parametrizations, deep learning models can be trained from data generated from the simulators, significantly reducing manual annotation; (3) Similarly, policies to control robots in complex environments can be trained in simulation and transferred to the physical system after reducing the chance of damage to the robot during training, and saving costs by reducing the amount of physical experiments that need to be performed.

In an embodiment, simulators are an important tool that enables efficient machine learning in robotics. In an embodiment, physically accurate and photo-realistic simulation, perception models, and control policies, can be trained more easily before being transferred to real robots, saving both time and costs of running complex experiments. However, in an embodiment, lack of knowledge about the correct simulation parameters, oversimplified simulation models, or insufficient numerical precision for differential equation solvers can produce a simulation that is not sufficiently similar to the real system being simulated. In an embodiment, to ameliorate this problem, domain randomization ("DR") is used. In domain randomization, different simulation parameters are sampled during training to produce a model that is robust to simulation uncertainty.

In an embodiment, one question regarding domain randomization is determining which simulation parameters to randomize over and from which distributions to sample their values. In one embodiment, these parameters and their distributions are determined in a manual process by iteratively testing whether a model learned in randomized simulation works well on the real system. In an embodiment, if the model does not work on the real robot, the randomization parameters are changed so that they better cover the conditions observed in the real world. In an embodiment, to overcome this manual tuning process, policy executions on a real robot can be used to automatically update a Gaussian distribution over the sampling parameters such that the simulator better matches reality. In an embodiment where sampling distributions are restricted to Gaussians, the approach is unable to model more complex uncertainties and dependencies among parameters.

FIG. 1 illustrates an example of a probabilistic inference harness 102 that determines a distribution of possible simulation parameters 112 that reproduce a real-world observation 106, in accordance with an embodiment. In an embodiment, the system 100 provides a principled Bayesian method that computes full posteriors over simulator parameters. In an embodiment, the system 100 leverages likelihood-free inference for Bayesian analysis methods to update posteriors over simulation parameters based on small sets of observations obtained on the real system. In an embodiment, the main difficulty in computing such posteriors relates to the evaluation of the likelihood function, which models the relationship between simulation parameters 108 and corresponding simulator results 110, or observations in the real world. In an embodiment, while a simulator 104 implicitly defines this relationship, the likelihood function uses the inverse of the simulator model, i.e., how observed system behavior can be used to derive corresponding simulation parameters. In an embodiment, the Bayesian inferencing techniques described herein do not assume access to the internal differential equations underlying the simulator 104 and treat the simulator 104 as a black box.

In an embodiment, the Bayesian inferencing techniques described herein provide a generic framework for probabilistic inference with robotics simulators and provides a full space of simulation parameters that best fit observed data. In contrast, various alternative systems provide an approximate point solution. In an embodiment, the Bayesian inferencing techniques described herein provide a novel mixture density random Fourier network to approximate the conditional distribution $p(\theta|x^r)$ directly by learning from pairs $$\{\theta_i, x_i^s\}_{i=1}^N$$

generated from the proposal prior and the simulator. In an embodiment, by generating policies with domain randomization where the simulator parameters are randomized according to the posterior, the Bayesian inferencing techniques described herein generate policies that are significantly more robust and easier to train than randomization directly from the prior.

In an embodiment, the simulator 104 is a computer system configured with executable instructions that implement a model of a real-world environment, task, or scenario. In an embodiment, the computer system includes a processor and memory such as those illustrated in FIGS. 16-20. In an embodiment, the simulator 104 models a system that includes a robot performing a task. In an embodiment, the robot is a self-driving vehicle, and the task is street navigation. In an embodiment, the simulator 104 takes a set of parameters 108 as input, and the parameters influence the operation of the simulator. In an embodiment, the set of parameters 108 may be adjusted so that the simulator 104 closely approximates a real-world environment or produces a desired result.

In an embodiment, the probabilistic inference harness 102 is a computer system configured with executable instructions that interfaces with the simulator 104. In an embodiment, the probabilistic inference harness 102 provides the simulator with a set of parameters 108, and receives a corresponding simulator result 110. In an embodiment, the internals of the simulator 104 are not accessible to the probabilistic inference harness, and the probabilistic inference harness 102 invokes the simulator 104 multiple times to generate a plurality of samples. In an embodiment, each sample in the plurality of samples is a value pair comprising a set of input parameters and a corresponding simulator result produced by the set of input parameters. In an embodiment, the samples are processed by the probabilistic inference harness 102 to produce an estimated distribution of parameters that produce a given result from the simulator. In an embodiment, the probabilistic inference harness 102 takes a real-world observation as input. In an embodiment, the real-world observation is obtained by directing a task approximated by the simulation in the real world and measuring the result in the real world. In an embodiment, the real-world observation 106 is a target value or desired value for which the probabilistic inference harness 102 determines a corresponding set of parameters (or sets of parameters). In embodiment, the corresponding set of parameters is determined as a distribution that indicates the chance that a parameter will produce the desired result.

In an embodiment, simulators are used to accelerate machine learning impact by allowing faster, highly-scalable and low cost data collection. In an embodiment, the present system may be applied to fields such as economics, evolutionary biology, and cosmology, where simulators provide advancements in scientific discovery. In an embodiment, for example, a "reality gap" may be present in a control system of robots, and robotics vision is also affected by this problem. In an embodiment, algorithms trained on images from a simulation may fail in different real-world environments as the appearance of the real world can differ greatly from that replicated in a simulation.

In an embodiment, randomizing the dynamics of a simulator while training a control policy mitigates the reality gap problem. In an embodiment, simulation parameters vary from physical settings like damping, friction and object masses to visual parameters like objects textures, and shapes. In an embodiment, noise is added to the system parameters instead of sampling new parameters from a uniform prior distribution. In an embodiment, perturbation can also be seen on robot locomotion where planning is done through an ensemble of perturbed models. In an embodiment, interleaving policy rollouts between simulation and reality may also work well on swing-peg-in-hole and opening a cabinet drawer tasks.

In an embodiment, learning models from simulations of data leverage an understanding of the physical world, potentially helping to solve related problems. In an embodiment, Approximate Bayesian Computation ("ABC") is used to tackle this type of problem. In an embodiment, Rejection ABC is a method where parameter settings are accepted/rejected if they are within a certain specified range. In an embodiment, the set of accepted parameters approximates the posterior for the real parameters. In an embodiment, the Bayesian inferencing techniques described herein use Markov Chain Monte Carlo ABC ("MCMCABC") to perturb accepted parameters rather than independently proposing new parameters. In an embodiment, the Bayesian inferencing techniques described herein use Sequential Monte Carlo ABC ("SMC-ABC") to leverage sequential importance sampling to simulate slowly changing distributions where the successive distribution is an approximation of the true parameter posterior. In an embodiment, the Bayesian inferencing techniques described herein use an $\epsilon$-free approach for likelihood-free inference, where a Mixture of Density Random Fourier Network estimates the parameters of the true posterior through a Gaussian mixture.

In an embodiment, a wide range of complex robotics control problems may be solved using Deep Reinforcement Learning ("Deep RL") techniques. In an embodiment, control problems such as Pendulum, Mountain Car, Acrobot and Cart-pole may be successfully solved using policy search with algorithms such as Trust Region Policy Optimization ("TRPO") and Proximal Policy Optimization ("PPO"). In an embodiment, more complex tasks in robotics such as manipulation tasks are difficult to solve using traditional policy search. In an embodiment, the Bayesian inferencing techniques described herein may be used for policy search via domain randomization.

In an embodiment, the Bayesian inferencing techniques described herein take a prior $p(\theta)$ over simulation parameters $\theta$, a black box generative model or simulator $x^s=g(\theta)$ that generates simulated observations $x^s$ from these parameters, and observations from the physical world $x^r$ to compute the posterior $p(\theta|x^s, x^r)$. In an embodiment, the challenge in computing this posterior relates to the evaluation of the likelihood function $p(x|\theta)$ which is defined implicitly from the simulator. In an embodiment, the simulator is governed by a set of differential equations associated with a numerical or analytical solver which are typically intractable and expensive to evaluate. In an embodiment, the system is not able to access these equations directly and therefore treats the simulator as a black box. In an embodiment, this allows the system to be utilized with many robotics simulators (even closed-source ones) but requires a method where the likelihood cannot be evaluated directly but instead sampled from, by performing forward simulations. In an embodiment, this is referred to as a likelihood-free inference. In an embodiment, one family of algorithms to determine likelihood-free inference is approximate Bayesian computation ("ABC").

In an embodiment implementing ABC, the simulator is used to generate synthetic observations from samples following the parameters prior. In an embodiment, the samples are accepted when features or sufficient statistics computed from the synthetic data are similar to those from real observations obtained from physical experiments. In an embodiment, as a sampling-based technique, ABC can be slow to converge, particularly when the dimensionality of the parameter space is large. In an embodiment, ABC approximates the posterior $p(\theta|x=x^r) \propto p(x=x^r|\theta)p(\theta)$ using the Bayes' rule. In an embodiment however, as the likelihood function $p(x=x^r|\theta)$ is not available, other methods for Bayesian inference cannot be applied. In an embodiment, ABC solves this problem by approximating $p(x=x^r|\theta)$ by $p(\|x=x^r<\epsilon|\theta)$, where E is a small value defining a sphere around real observations $x^r$, and using Monte Carlo to estimate its value. In an embodiment, the quality of the approximation increases as E decreases; however, the computational cost can become prohibitive as most simulations will not fall within the acceptable region.

In an embodiment, the Bayesian inferencing techniques described herein may be applied to reinforcement learning and policy search in robotics. In an embodiment, the Bayesian inferencing techniques described herein are applied to a default RL scenario where an agent interacts in discrete timesteps with an environment E. In an embodiment, at each step t the agent receives an observation $o^t$, takes an action $d^t$ and receives a real number reward $r^t$. In an embodiment, actions in robotics are real valued $a^t \in R^D$ and environments are usually partially observed so that the history of observation is represented by action pairs $$\eta(\beta) = \{s_t, a_t, o_t\}_{t-0}^{T-1}.$$

In an embodiment, the Bayesian inferencing techniques described herein attempt to maximize the expected sum of discounted future rewards by following a policy $\pi(a_t|s_t;\beta)$, parametrized by $\beta$, $$J(\beta) = \mathbb{E}_\eta\left[\sum_{t-0}^{T-1} \gamma^t r(s_t, a_t) \middle| \beta\right].$$

In an embodiment, various approaches in reinforcement learning make use of the recursive relationship known as the Bellman equation where $Q^\pi$ is the action-value function describing the expected return after taking an action $a_t$, in state $s_t$ and thereafter following policy $\pi$, $$Q^\pi(s_t, a_t) = \mathbb{E}_{r_t, s_{t+1}}\left[r(s_t, a_t) + \gamma \mathbb{E}_{a_{t+1}}[Q^\pi[(s_{t+l}, a_{t-l})]]\right].$$

In an embodiment, RL methods are applied to control tasks with continuous action spaces. In an embodiment, Deep Deterministic Policy Gradients may be applied to a wide range of control problems. In an embodiment, one caveat is that DDPG algorithms rely on efficient experience sampling to perform well, therefore improving how experience is collected is an important topic. In an embodiment, Experience Replay and Prioritized Experience Replay performs poorly in a repertoire of robotics tasks where the reward signal is sparse. In an embodiment, Hindsight Experience Replay ("HER") performs well in this scenario as it breaks down single trajectories/goals into smaller ones and, thus, provides the policy optimization algorithm with better reward signals.

In an embodiment, a policy search algorithm is based on optimization through trust regions. In an embodiment, optimization through trust regions is less sensitive to the experience sampling problem mentioned above. In an embodiment, the maximum step size for exploration is determined by its trust region, and the optimal point is then evaluated progressively until convergence has been reached. In an embodiment, updates are limited by their own trust region, and, therefore, learning speed is better controlled.

In an embodiment, Proximal Policy Optimization and Trust Region Policy optimization apply these ideas providing state-of-the-art performance in a wide range of control problems. In an embodiment, both techniques differ on the way experiences are sampled. In an embodiment, the first is an off-policy algorithm where experiences are generated by a behavior policy, and the second is an on-policy algorithm where the policy used to generate experience is the same used to perform the control task. In an embodiment, these algorithms have comparable performance on different robotics control scenarios.

In an embodiment, the Bayesian inferencing techniques described herein approximate the intractable posterior $p(\theta|x=x^r)$ by directly learning a conditional density $q_\phi(\theta|x)$ parameterized by parameters $\phi$. In an embodiment, as we shall see, $q_\phi(\theta|x)$ takes the form of a mixture density random feature network. In an embodiment, to learn the parameters $\phi$ the system first generates a dataset with N pairs $(\theta_n, x_n)$ where $\theta_n$ is drawn independently from a distribution $\tilde{p}(\theta)$ referred to as the proposal prior. $x_n$ is obtained by running the simulator with parameter $\theta_n$ such that $x_n=g(\theta_n)$. In an embodiment, $q_\phi(\theta|x)$ is proportional to $$\frac{\tilde{p}(\theta)}{p(\theta)} p(\theta | x)$$

when the likelihood $\Pi_n q_\phi(\theta_n|_n)$ is maximized w.r.t. $\phi$. In an embodiment, the log likelihood is maximized by the system $$\mathcal{L}(\phi) = \frac{1}{N} \log q_\phi(\theta | x_n)$$

to determine $\phi$. In an embodiment, after this is done, an estimate of the posterior is obtained by $$\hat{p}(\theta | x = x^r) \propto \frac{p(\theta)}{\tilde{p}(\theta)} q_\phi(\theta | x = x^r)$$

where $p(\theta)$ is the desirable prior that might be different than the proposal prior. In an embodiment, when $\tilde{p}(\theta)=p(\theta)$, it follows that $\hat{p}(\theta|e=x^r)=q_\phi(\theta|x=x^r)$. In an embodiment, when $\tilde{p}(\theta) \neq p(\theta)$ the system adjusts the posterior as described below. In an embodiment, the Bayesian inferencing techniques described herein model the conditional density $q_\phi(\theta|x)$ as a mixture of K Gaussians, $$q_\phi(\theta | x) = \sum_k \alpha_k N\left(\theta | \mu_k, \sum_k\right)$$

where $\alpha=(\alpha_1, \ldots, \alpha_k)$ are mixing coefficients, $\{\mu_k\}$ are means and $\{\Sigma_k\}$ are covariance matrices. In an embodiment, the Bayesian inferencing techniques described herein use Quasi Monte Carlo (QMC) random Fourier features when computing α, μ and Σ as described below.

In an embodiment, Ψ(x) is denoted as the feature vector, and the mixing coefficients are calculated as $$\alpha = \text{softmax}(W_\alpha \Phi(x) + b_\alpha).$$

In an embodiment, the operator $$Soft\max(z)_i = \frac{\exp(z_i)}{\sum_{k=1}^{K} \exp z_k}$$

for i=1; . . . ; K enforces that the sum of coefficients is equal to 1 and each coefficient is between 0 and 1. In an embodiment, the means are defined as linear combinations of feature vectors. In an embodiment, for each component of the mixture, $$\mu_k = W_{\mu_k} \Phi(x) + b_{\mu_k}.$$

In an embodiment, the Bayesian inferencing techniques described herein parametrize the covariance matrices as diagonals matrices with $$\text{diag}(\textstyle\sum_k) = mELU\big(W_{\Sigma_k} \Phi(x) + b_{\Sigma_k}\big)$$

where mELU is a modified exponential linear unit defined as $$mELU(z) = \begin{cases} \propto (e^z - 1) + 1 & \text{for } z \leq 0 \\ z + 1 & \text{for } z > 0 \end{cases}$$

to enforce positive values. In an embodiment, the diagonal parametrization assumes independence between the dimensions of the simulator parameters θ. In an embodiment, this is not excessively restrictive if the number of components in the mixture is sufficiently large.

In an embodiment, the full set of parameters for the mixture density network is, $$\phi = \big(W_\alpha, b_\alpha \big\{W_{\mu_k}, b_{\mu_k}, W_{\Sigma_k} b_{\Sigma_k}\big\}_{k=1}^{K}\big).$$

In an embodiment, neural network features may be used to model the density. In an embodiment, the Bayesian inferencing techniques described herein can use neural network features creating a model similar to the mixture density network. In an embodiment, for a feedforward neural network with two fully connected layers, the features take the form $$\Phi(x) = \sigma(W_2(\sigma(W_1 x + b_1)) + b_2)$$

where σ(•) is a sigmoid function; we use σ(•)=tan h(•) in the experiments described herein. In an embodiment, this network structure is used in the experiments and compared to the Quasi Monte Carlo random features described below.

In an embodiment, Quasi Monte Carlo random features are used to model the density.

In an embodiment, the Bayesian inferencing techniques described herein use random Fourier features instead of neural nets to parameterize the mixture density. In an embodiment, there are several reasons why this can be a good choice: 1) random Fourier features—of which QMC features are a particular type—approximate possibly infinite Hilbert spaces with properties defined by the choice of the associated kernel. In this way prior information about properties of the function space can be readily incorporated by selecting a suitable positive semidefinite kernel, in an embodiment; 2) in an embodiment, the approximation converges to the original Hilbert space with order $O(1/\sqrt{s})$ where s is the number of features, therefore independent of the input dimensionality; 3) in an embodiment, we experimentally verified that mixture densities with random Fourier features are more stable to different initializations and converge to the same local maximum in most cases.

In an embodiment, Random Fourier features approximate a shift invariant kernel k(τ), where τ=||x−x'||, by a dot product $k(\tau)\approx\Phi(x)^T\Phi(x')$ of finite dimensional features Φ(x). In an embodiment, this is possible by first applying the Bochner's theorem [33] stated below:

Theorem 1 (Bochner's Theorem) a shift invariant kernel k(τ), $\tau\in\mathbb{R}^D$, associated with a positive finite measure dμ(ω) can be represented in terms of its Fourier transform as, $$k(\tau) = \int_{\mathbb{R}^D} e^{-i\omega\cdot\tau} d\mu(\omega).$$

In an embodiment, when μ has density $\mathcal{K}(\omega)$ then $\mathcal{K}$ represents the spectral distribution for a positive semidefinite k, and in this case k(τ) and $\mathcal{K}(\omega)$ are Fourier duals:

$$k(\tau) = \int \mathcal{K}(\omega) e^{-i\omega\cdot\tau} d\omega.$$

In an embodiment, approximating the above equation with a Monte Carlo estimate with N samples, yields $$k(\tau) = \frac{1}{N} \Sigma_{n=1}^{N} \big(e^{-i\omega_n x}\big)\big(e^{-i\omega_n x'}\big)$$

where w is sampled from the density $\mathcal{K}(\omega)$.

In an embodiment, using Euler's formula ($e^{-ix}$=cos(x)−i sin(x)) the features are recovered:

$$\Phi(x) = \frac{1}{\sqrt{N}} [\cos(\omega_1 x + b_1), \ldots, \cos(\omega_n x + b_n), -i\cdot\sin(\omega_1 x + b_1), \ldots, -i\cdot\sin(\omega_n x + b_n)],$$

where bias terms $b_i$ are introduced with the goal of rotating the projection and allowing for more flexibility in capturing the correct frequencies.

In an embodiment, this approximation is used with shift invariant kernels to provide flexibility in introducing prior knowledge by selecting a suitable kernel for the problem. In an embodiment, for example, the RBF kernel can be approximated using the features above with $\omega \sim (0, 2\sigma^{-2}I)$ and $b \sim U[-\pi, \pi]$. $\sigma$ is a hyperparameter that corresponds to the kernel length scale and is usually set up with cross validation.

In an embodiment, a quasi Monte Carlo strategy is adopted to sample the frequencies. In an embodiment, Halton sequences are used which have a better convergence rate and lower approximation error than standard Monte Carlo techniques. In the present document, the term function of a frequency may be used to refer to selected Fourier features, including randomly selected Fourier features, Fourier features selected using Monte Carlo or quasi Monte Carlo techniques, and Fourier features selected based on Halton sequences.

In an embodiment, the posterior is recovered. In an embodiment, as can be inferred from the equations above, if the proposal prior is different from the desirable prior, the system adjusts the posterior by weighting it with the ratio $p(\theta)/\tilde{p}(\theta)$.

In an embodiment, the prior is uniform, either with finite support—defined within a range and zero elsewhere—or improper, constant value everywhere. In an embodiment therefore, $$\hat{p}(\theta \mid x = x^r) \propto \frac{q_\phi(\theta \mid x^r)}{\tilde{p}(\theta)}.$$

In an embodiment, when the proposal prior is Gaussian, the Bayesian inferencing techniques described herein are able to compute the division between a mixture and a single Gaussian analytically. In an embodiment, since $q_\phi(\theta|x)$ is a mixture of Gaussians and $\tilde{p}(\theta) \sim \mathcal{N}(\theta|\mu_0, \Sigma_0)$, the solution is given by $$\hat{p}(\theta \mid x = x^r) = \sum\nolimits_k \alpha'_k (\left(\theta \mid \mu'_k, \sum\nolimits'_k\right)$$

where, $$\sum\nolimits'_k = \left(\sum\nolimits_k^{-1} - \sum\nolimits_0^{\prime -1}\right)^{-1}$$

$$\mu'_k = \sum\nolimits_k^{-1}\left(\sum\nolimits_k^{-1}\mu_k - \sum\nolimits_0^{-1}\mu_0\right)$$

$$\alpha'_k = \frac{\alpha_k \exp\left(-\frac{1}{2}\lambda_k\right)}{\alpha_k, \exp\left(-\frac{1}{2}\lambda'_k\right)}$$

and the coefficients $\lambda_k$ are given by $$\lambda_k = \log\ \det\sum\nolimits_k - \log\ \det\sum\nolimits_0 - \log\ \det\sum\nolimits'_k + \mu_k^T\sum\nolimits_k^{-1}\mu_k - \mu_0^T\sum\nolimits_0^{-1}\mu_0 - \mu_k'^T\sum\nolimits_k^{\prime -1}\mu'_k.$$

In an embodiment, trajectories of state and action pairs in typical problems can be long sequences making the input dimensionality to the model prohibitive large and computationally expensive. In an embodiment, instead of inputting raw state and action sequences to the model, the system first computes sufficient statistics. In an embodiment, formally, $x=\psi(S,A)$ where $$S = \{s^t\}_{t=1}^T \text{ and } A = \{a^t\}_{t=1}^T$$

are sequences of states and actions from t=1 to T. In an embodiment, there are many options for sufficient statistics for time series or trajectory data such as, the mean, log variance and autocorrelation for each time series as well as cross-correlation between two time series. In an embodiment, the system learns these from data, for example with an autoencoder. In an embodiment, the Bayesian inferencing techniques described herein use statistics often applied to stochastic dynamic systems such as the Lotka-Volterra model.

In an embodiment, defining $$\tau = \left\{s^t - s^{t-1}\right\}_{t=1}^T$$

as the difference between immediate future states and current states, the statistics $$\psi(S, A) = \left(\{\langle \tau_i, A_j \rangle\}_{i=1,j=1}^{D_s,D_a}, E[\tau], \mathrm{Var}[\tau]\right)$$

where $D_s$ is the dimensionality of the state space, $D_a$ is the dimensionality of the action space, ⟩•,•⟨ denotes the dot product, E[•] is the expectation, and Var[•] is the variance.

In an embodiment, a Fetch robot available in OpenAI Gym is used to perform both push and slide tasks. In an embodiment, a closed loop scenario is used where the arm is always in range of the entire table and, hence, it can correct its trajectories according to the input it receives from the environment. In an embodiment, a more difficult open loop scenario is used, where the robot has usually only one shot at pushing the puck to its desired target. In an embodiment, for both tasks, the friction coefficient of the object and the surface plays a major role in the final result as they are strictly related to how far the object goes after each force is applied. In an embodiment, a very low friction coefficient infers that the object is harder to control as it slides more easily and a very high one means that more force needs to be applied in order to make the object move.

Figure 2:
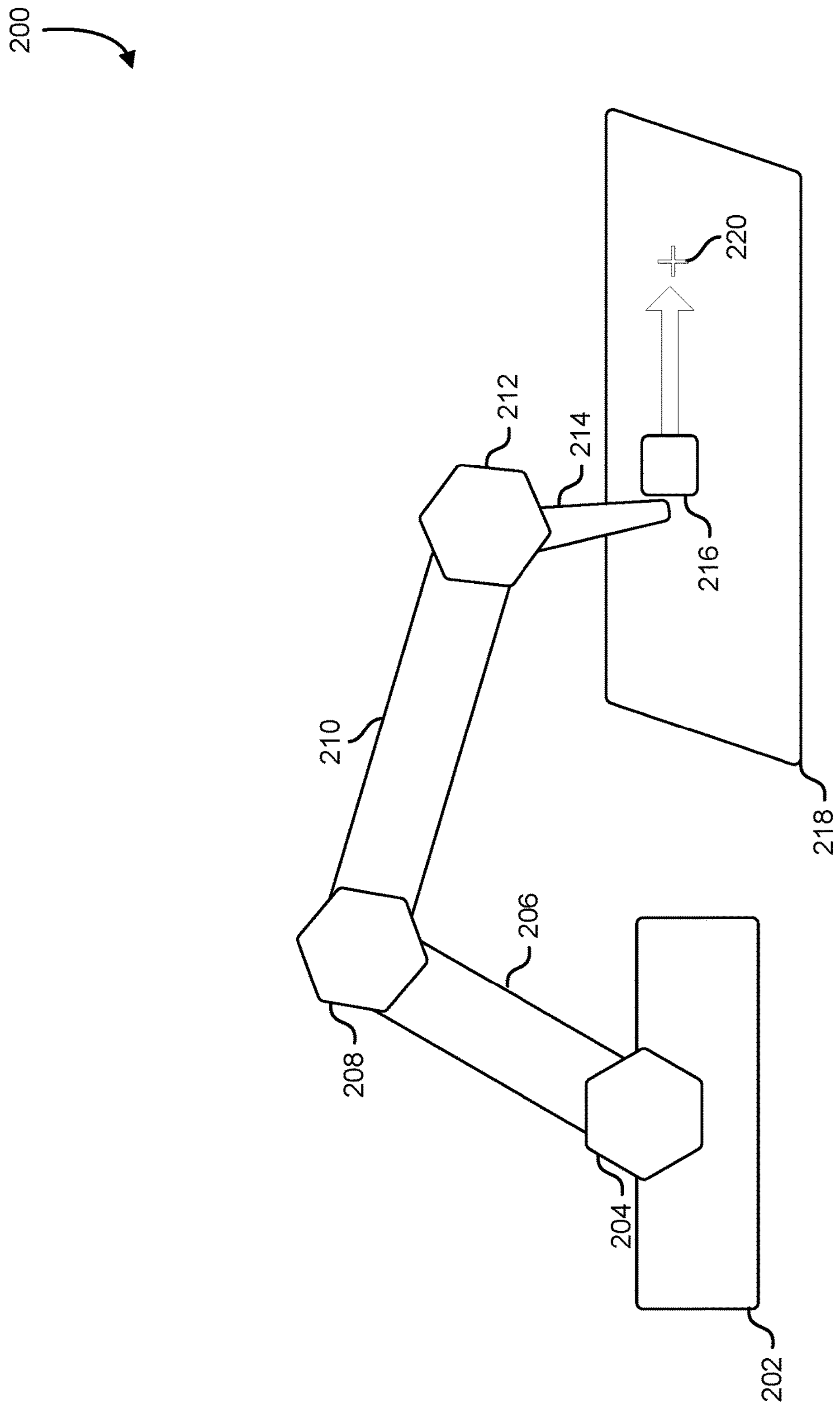
FIG. 2 illustrates an example of a robot that performs a fetch-slide task in which the robot has limited access to a table, in accordance with an embodiment.

FIG. 2 illustrates an example of a robot 200 that performs a fetch-slide task in which the robot has limited access to a table, in accordance with an embodiment. In an embodiment, the robot 200 is attached to a base 202. In an embodiment, a first articulated joint 204 connects the base 202 to a first arm 206. In an embodiment, the first arm 206 is connected to a second arm 210 via a second articulated joint 208. In an embodiment, the second arm 210 is connected to a probe 214 via a third articulated joint 212. In an embodiment, a controlling computer system directs the operation of servo motors, pneumatic actuators, or hydraulic actuators that control the motion of the articulated joints. In an embodiment, the controlling computer system implements a solution to a fetch-slide problem in which the robot 200 attempts to slide a puck 216 to a target 220. In an embodiment, the robot 200 does not have full access to a table 218, and, therefore, the robot may not be able to make repeated attempts at successfully completing the task because the puck may become unreachable.

Figure 3:
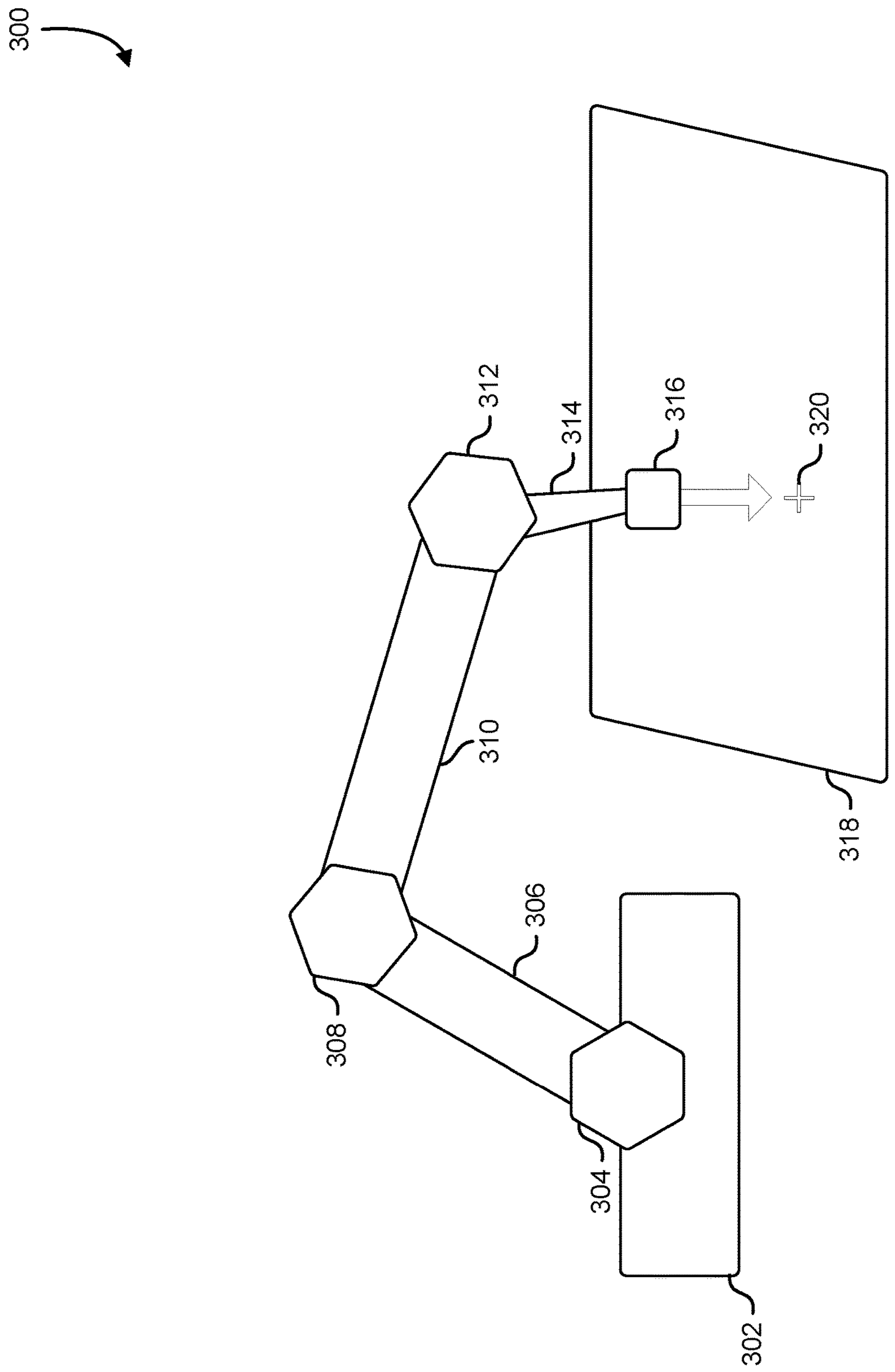
FIG. 3 illustrates an example of a robot that performs a fetch-push task in which the robot has limited access to a table, in accordance with an embodiment.

FIG. 3 illustrates an example of a robot 300 that performs a fetch-push task in which the robot has full access to a table 318, in accordance with an embodiment. In an embodiment, the robot 200 is attached to a base 302. In an embodiment, a first articulated joint 304 connects the base 302 to a first arm 306. In an embodiment, the first arm 306 is connected to a second arm 310 via a second articulated joint 308. In an embodiment, the second arm 310 is connected to a probe 314 via a third articulated joint 312. In an embodiment, a controlling computer system directs the operation of servo motors, pneumatic actuators, or hydraulic actuators that control the motion of the articulated joints. In an embodiment, the controlling computer system implements a solution to a fetch-slide problem in which the robot 300 attempts to push a puck 316 to a target 320. In an embodiment, the robot 300 has full access to a table 318, which allows the robot to reposition and make multiple attempts at successfully completing the task.

Figure 4:
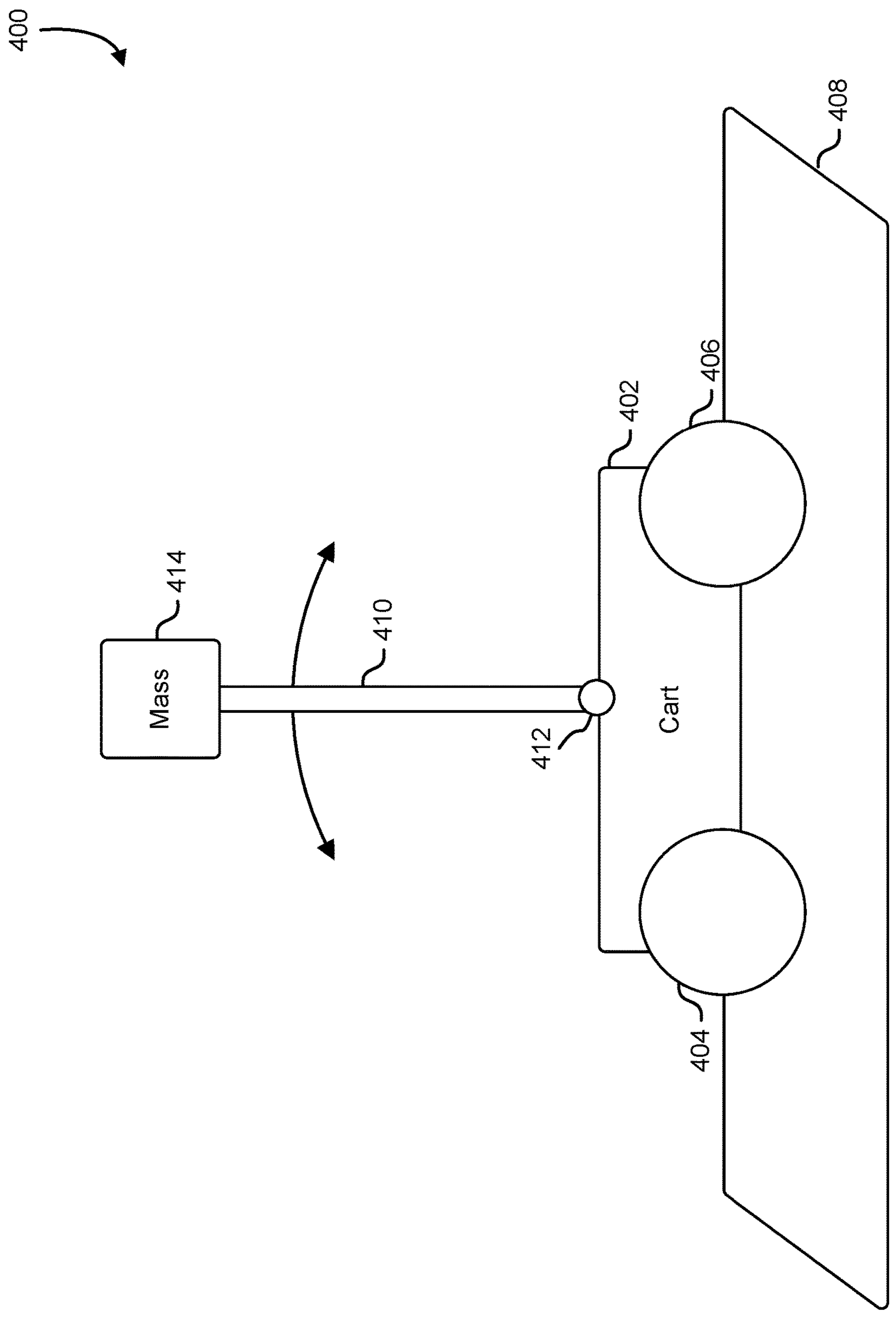
FIG. 4 illustrates an example of a robot that performs a cart-pole balancing task in which the robot controls the motion of a cart, in accordance with an embodiment.

In an embodiment, the Bayesian inferencing techniques described herein are demonstrated by estimating unknown simulation parameters for the Cart-Pole problem. FIG. 4 illustrates an example of a robot that performs a cart-pole balancing task in which the robot controls the motion of a cart, in accordance with an embodiment. In an embodiment, the system 400 includes a cart 402 with wheels 404 and 406 that allow the cart to move along a surface 408. In an embodiment, a pole 410 is connected to the cart 402 using a pivot 412. In an embodiment, the pivot 412 allows the pole to fall on an axis perpendicular to the motion of the cart. In an embodiment, a computer control system is able to move the cart (left and right as shown in the example of FIG. 4) to keep the pole upright. In an embodiment, a mass 414 is positioned at the top of the pole. In an embodiment, the control parameters used to keep the pole upright depend primarily on the mass 414 and the length of the pole.

Figure 5:
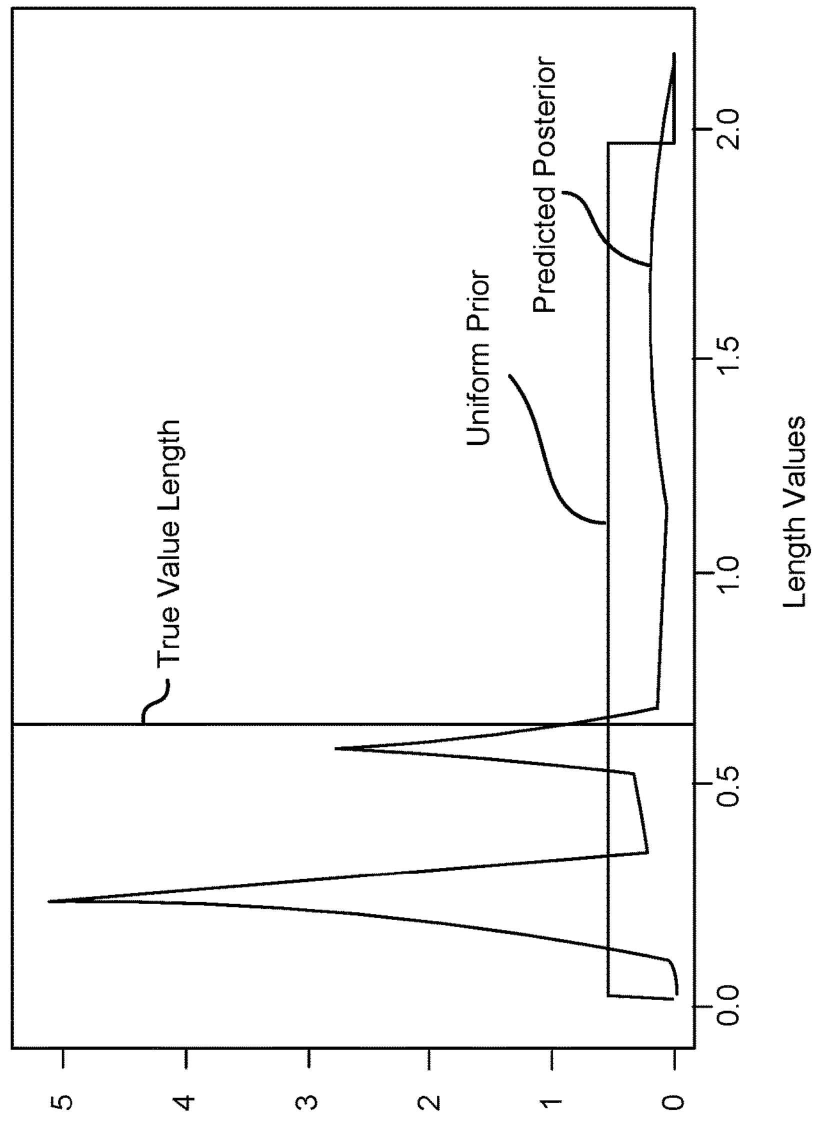
FIG. 5 illustrates an example of a posterior for the pole length of the cart-pole problem, in accordance with an embodiment.
Figure 6:
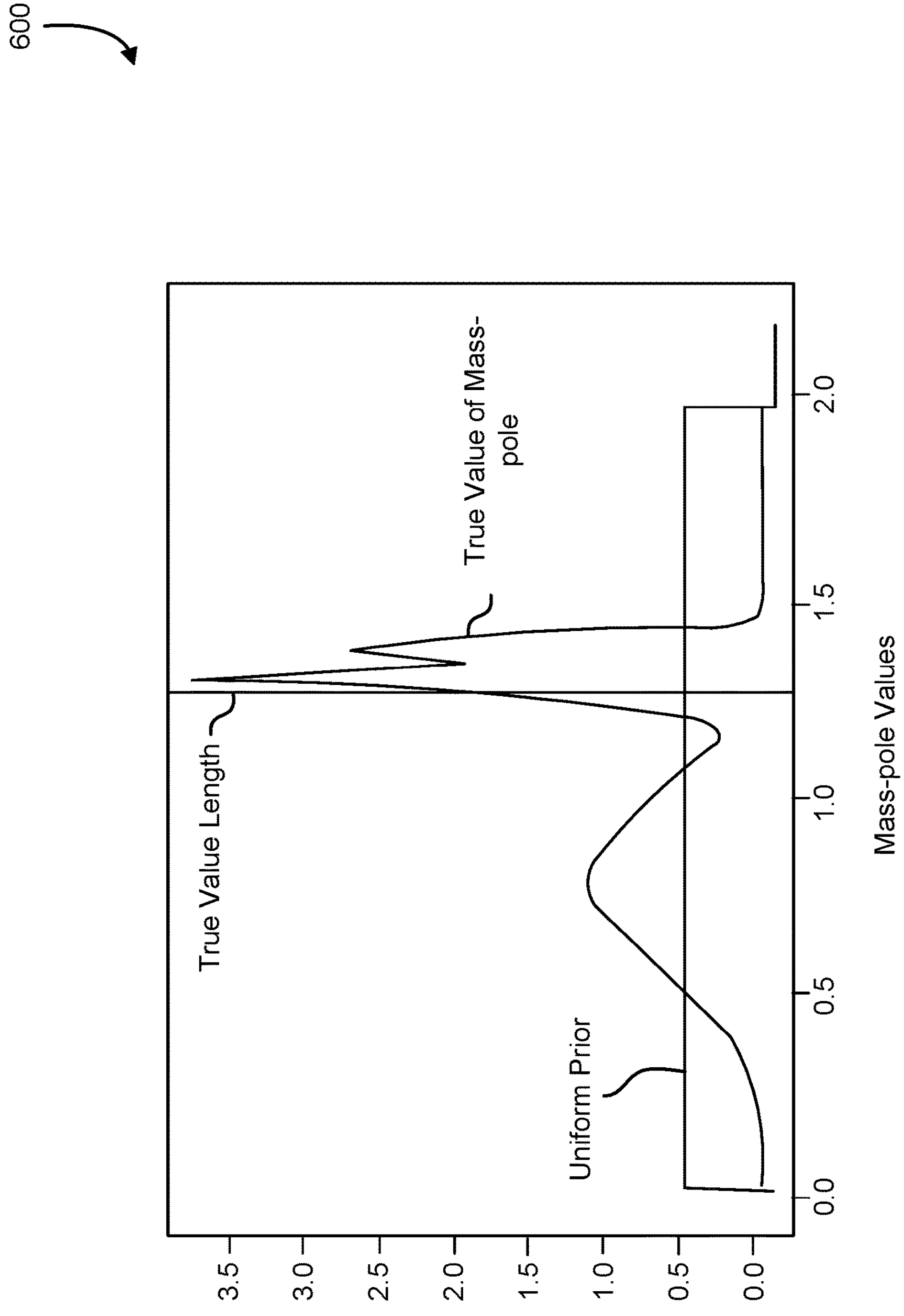
FIG. 6 illustrates an example of a posterior for the masspole of the cart-pole problem, in accordance with an embodiment.

In an embodiment, the pole 410 installed on a cart 402 is balanced by applying forces to the left or to the right of the cart 402. In an embodiment, both the mass 414 and the length of the pole 410 are not available, and we use the Bayesian inferencing techniques described herein to obtain the posterior for these parameters. In an embodiment, the system uses uniform priors for both parameters and collects 1000 simulations following an rl-zoo policy to train the system. In an embodiment, with the model trained, the system may collect 10 trajectories with the correct parameters to simulate real observations. FIG. 5 illustrates an example 500 of a posterior for the pole length of the cart-pole problem, in accordance with an embodiment. FIG. 6 illustrates an example 600 of a posterior for the masspole of the cart-pole problem, in accordance with an embodiment. In an embodiment, mass and pole length exhibit statistical dependencies that generate multiple explanations for their values. In an embodiment, the pole may have lower mass and longer length, or a higher mass and a shorter length. In an embodiment, the system is able to recover the multi-modality nature of the posterior providing densities that represent the bi-modal uncertainty of the problem accurately.

In an embodiment, the system performs domain randomization using a strategy that takes advantage of the posterior obtained by the inference method. In an embodiment, given the posterior obtained from the simulation parameters $\hat{p}(\theta|x=x^r)$ the system maximizes the objective, $$J(\beta) = \mathbb{E}_{\theta}\left[\mathbb{E}_{\eta}\left[\sum_{t-0}^{T-1} \gamma^{(t)} r(s_t, a_t) \,\middle|\, \beta\right]\right]\}$$

where $\theta \sim \hat{p}(\theta|x=x^r)$ with respect to the policy parameters $\beta$. In an embodiment, the posterior is a mixture of Gaussians, and therefore the first expectation is approximated by sampling a mixture component following the distribution over $\alpha$ to obtain a component k, followed by sampling the corresponding Gaussian $\mathcal{N}(\theta|\mu_k,\Sigma_k)$.

In an embodiment, the accuracy of the posterior recovered is verified as follows. In an embodiment, the first analysis we carry out is the quality of the posteriors obtained for different problems and methods. In an embodiment, the Bayesian inferencing techniques described herein use the log probability of the target under the mixture model as the measure, defined as $\log p(\theta_*||x=x^r)$, where $\theta_*$ is the actual value for the parameter. In an embodiment, we compare Rejection-ABC as the baseline, $\epsilon$-Free which provides a mixture model as the posterior, and the Bayesian inferencing techniques described herein using either a two layer neural network with 24 units in each layer, or the Bayesian inferencing techniques described herein with quasi-random Fourier Features.

In an embodiment, a Matern 5/2 kernel is used and the sampling precision a is set up by cross validation. In an embodiment, three different simulators were used for different problems; OpenAI Gym, PyBullet 2, and MuJoCo. In an embodiment, the following problems are presented; Cart-Pole (Gym), Pendulum (Gym), Mountain Car (Gym), Acrobot (Gym), Hopper (PyBullet), Fetch Push (MuJoCo) and Fetch Slide (MuJoCo). In an embodiment, for all configurations of methods and parameters, training and testing are performed five times with the log probabilities averaged and standard deviation computed. In an embodiment, to extract the real observations, the environments are simulated with the actual parameters 10 times and an average of the results is used to obtain $x^r$. In an embodiment, sufficient statistics are collected by performing rollouts for either a maximum of 200 time steps or until the end of the episode.

FIG. 8 illustrates a variety of log-predicted probabilities for various methods and problems, in accordance with an embodiment. In an embodiment, a table 800 shows the results (means and standard deviations) for the log probabilities. In an embodiment, the Bayesian inferencing techniques described herein with either RFF or Neural Network features provides generally higher log-probabilities and lower standard deviation than Rejection ABC. In an embodiment, this indicates that the posteriors provided by the Bayesian inferencing techniques described herein are more peaked and centered around the correct values for the parameters. In an embodiment, compared to $\epsilon$-Free, the results are equivalent in terms of the means but the Bayesian inferencing techniques described herein generally provides lower standard deviation across multiple runs of the method, indicating it is more stable than $\epsilon$-Free. Comparing an embodiment of the Bayesian inferencing techniques described herein with RFF and NN, the RFF features lead to higher log probabilities in most cases but the versions that use neural networks have lower standard deviation.

Figure 7:
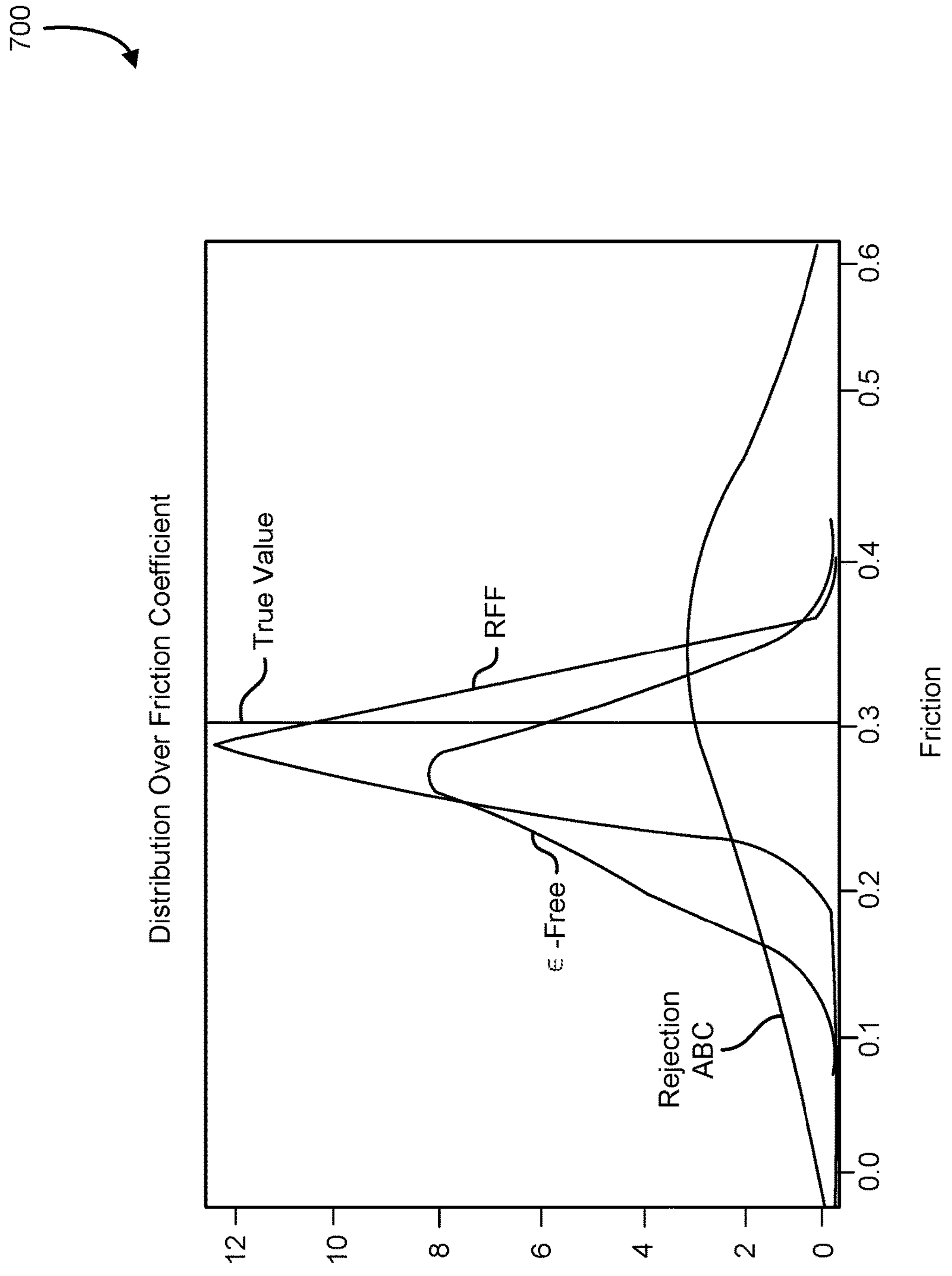
FIG. 7 illustrates an example of posteriors recovered by different methods for the fetch-slide problem, in accordance with an embodiment.

In an embodiment, the results suggest that the Bayesian inferencing techniques described herein with either RFF or NN are superior when estimating the posterior distribution over the simulation parameters. In an embodiment, for the robotics problems analyzed below, however, the Bayesian inferencing techniques described herein with RFF provides significant superior results over other methods tested, and slightly better results than the Bayesian inferencing techniques described herein with NN. This is illustrated by the plot of the posteriors in FIG. 7. FIG. 7 illustrates an example 700 of posteriors recovered by different methods for the fetch-slide problem, in accordance with an embodiment. In an embodiment, the Bayesian inferencing techniques described herein that uses RFF is significantly more peaked and centered around the true friction value.

Figure 9:
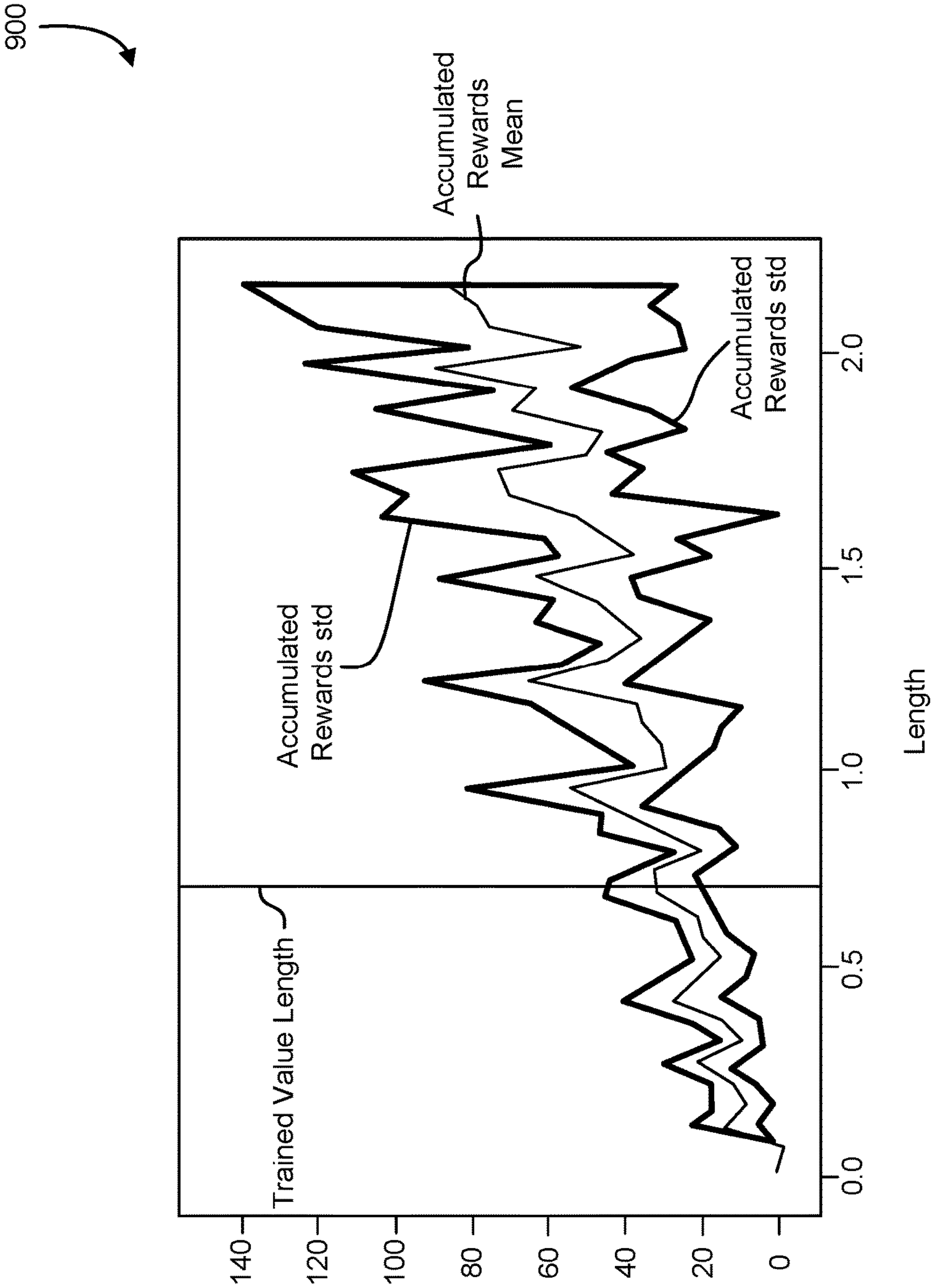
FIG. 9 illustrates an example of accumulated rewards for cart-pole policies trained by randomizing with a prior of the length parameter, in accordance with an embodiment.
Figure 10:
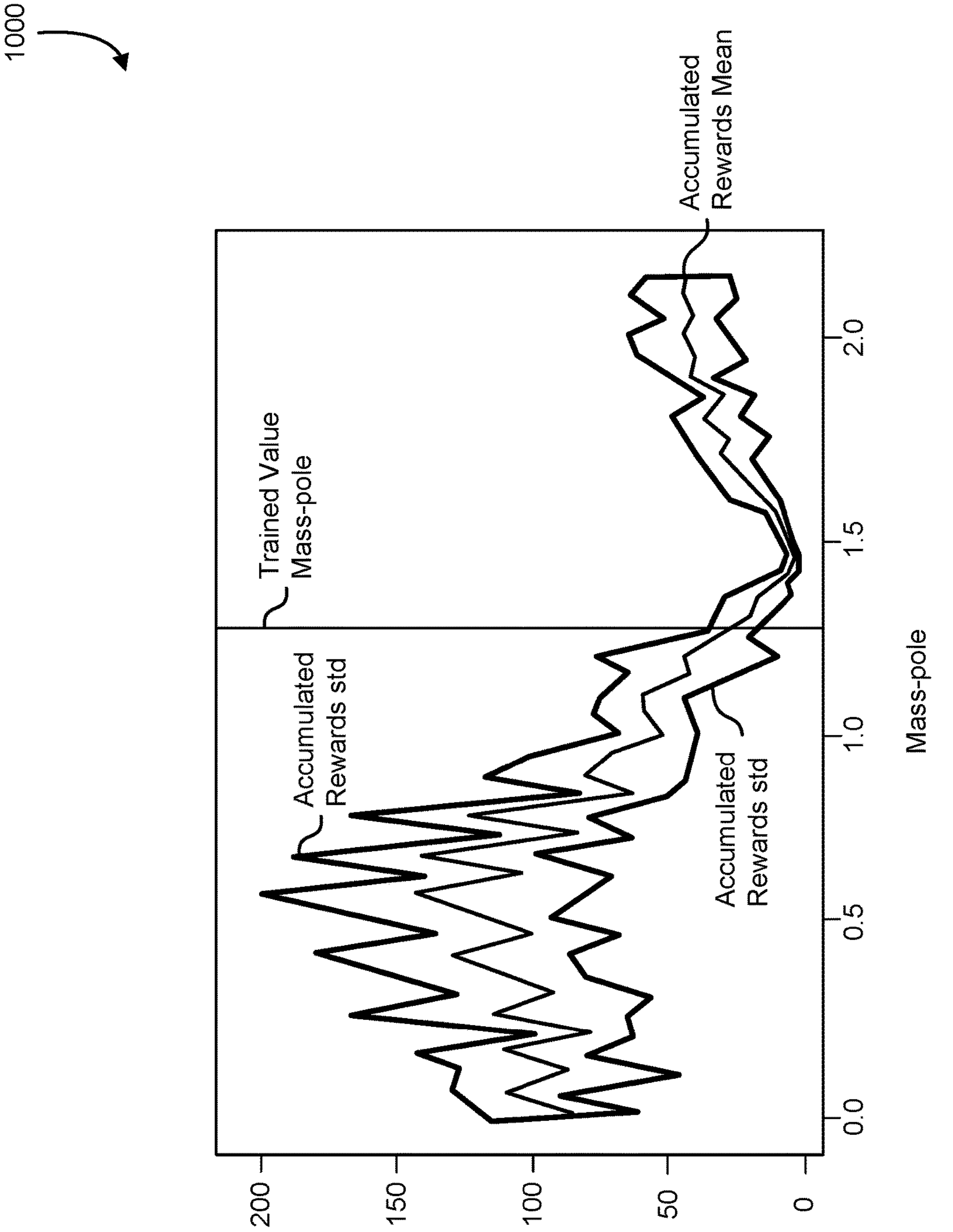
FIG. 10 illustrates an example of accumulated rewards for cart-pole policies trained by randomizing with a prior of the masspole parameter, in accordance with an embodiment.
Figure 11:
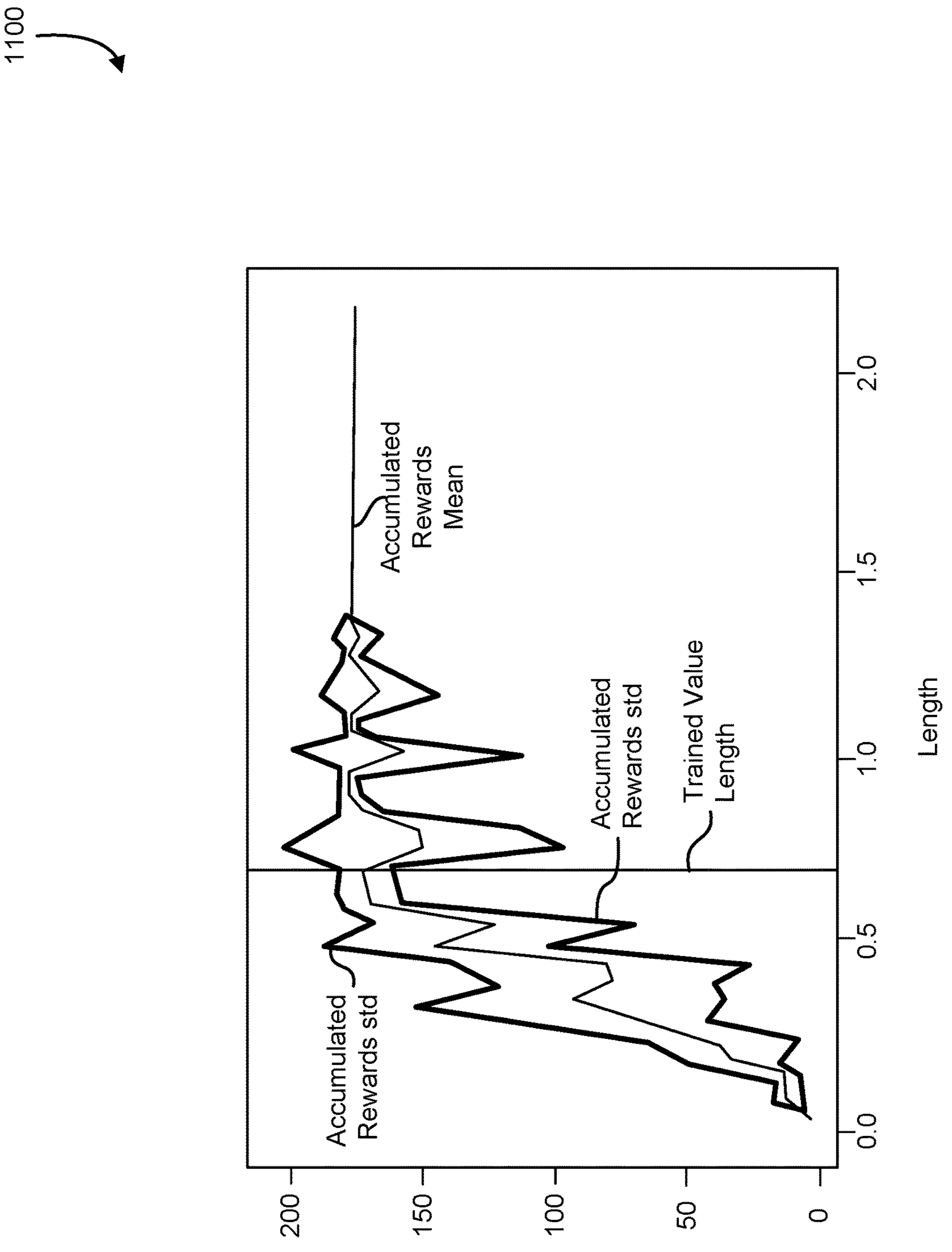
FIG. 11 illustrates an example of accumulated rewards for cart-pole policies trained by randomizing with a posterior of the length parameter, in accordance with an embodiment.
Figure 12:
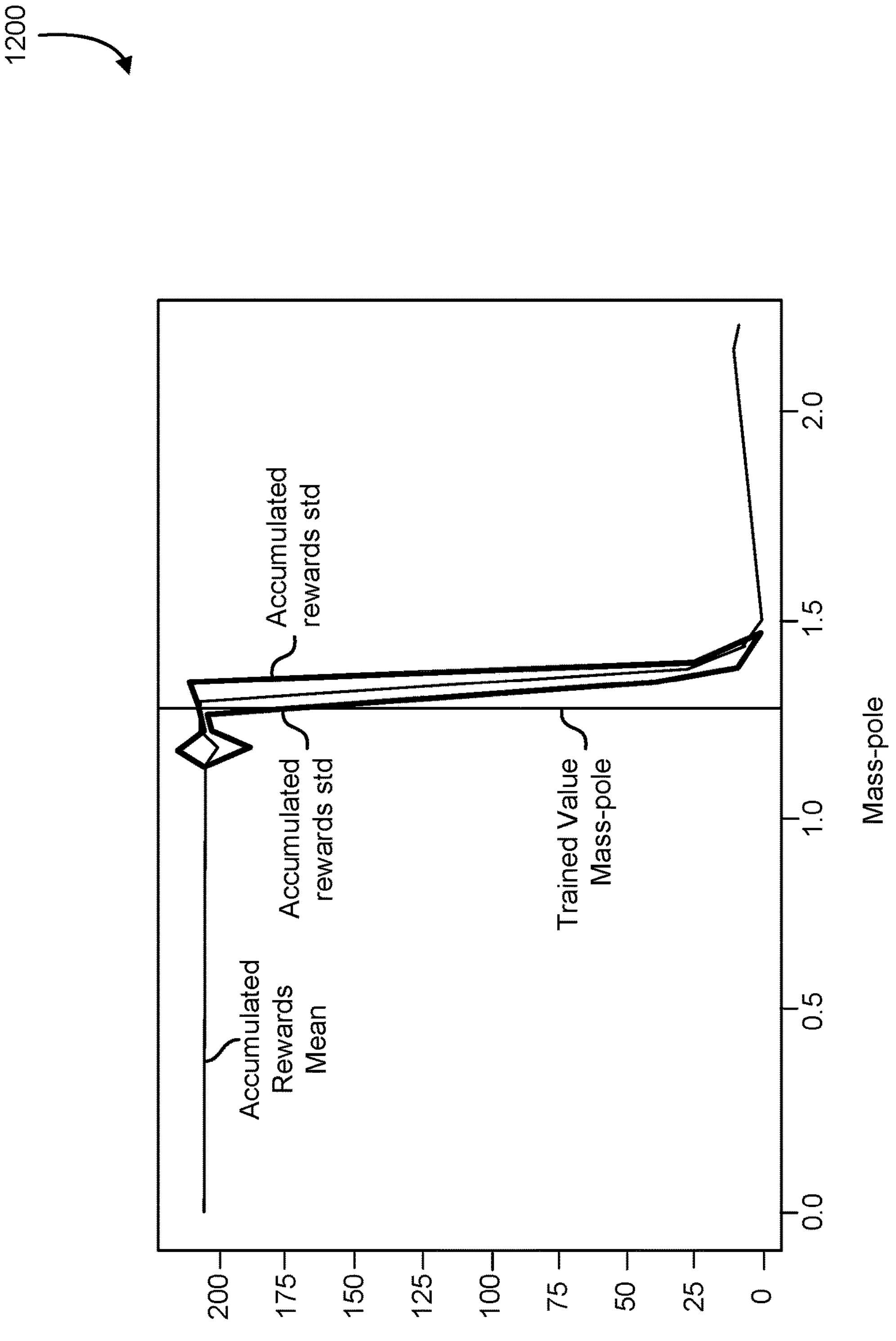
FIG. 12 illustrates an example of accumulated rewards for cart-pole policies trained by randomizing with a posterior of the masspole parameter, in accordance with an embodiment.

In an embodiment, the robustness of policies is evaluated by comparing their performance on the uniform prior and a learned posterior. In an embodiment, the evaluation is done over a pre-defined range of simulator settings and the average reward is shown for each parameter value in FIGS. 9-12. FIG. 9 illustrates an example 900 of accumulated rewards for cart-pole policies trained by randomizing with a prior for the length parameter, in accordance with an embodiment. FIG. 10 illustrates an example 1000 of accumulated rewards for cart-pole policies trained by randomizing with a prior for the masspole parameter, in accordance with an embodiment. FIG. 11 illustrates an example 1100 of accumulated rewards for cart-pole policies trained by randomizing with a posterior for the length parameter, in accordance with an embodiment. FIG. 12 illustrates an example 1200 of accumulated rewards for cart-pole policies trained by randomizing with a posterior for the masspole parameter, in accordance with an embodiment.

In an embodiment, in a set of experiments the Cart-Pole problem is used to illustrate the benefits of posterior randomization. In an embodiment two policies are trained, the first randomizing with a uniform prior for length and masspole as indicated in FIG. 8, and the second randomized based on the posterior provided by the Bayesian inferencing techniques described herein with RFF. In an embodiment, both cases use PPO to train the policies with 100 samples from the prior and posterior, for 2M timesteps. In an embodiment, the results are presented in FIGS. 9-12, averaged over several runs with the corresponding standard deviations. In an embodiment, randomization over the posterior yields a significantly more robust policy, in particular at the actual parameter value. In an embodiment, the reduction in performance for lower length values and higher masspole values is notable. In an embodiment, it is more difficult to control the pole position when the length is short due to the increased dynamics of the Bayesian inferencing techniques described herein. In an embodiment, when the mass increases substantially beyond the value it was actually trained on, the controller struggles to maintain the pole balanced. In an embodiment, the policy learned with the posterior seems much more stable across multiple runs as indicated by the lower variance in the plots.

In an embodiment, the goal is to recover a good approximation of the posterior over friction coefficients using the Bayesian inferencing techniques described herein. In an embodiment, a policy with a fixed friction coefficient that will be used for data generation purposes is trained using DDPG with experiences being sampled using HER for 200 epochs with 100 episodes/rollouts per epoch. In an embodiment, Gradient updates are done using Adam with step size of 0.001. In an embodiment, the policy is run multiple times with different friction coefficients in order to approximate the likelihood function and recover the full posterior over simulation parameters. In an embodiment, using the dynamics model, the Bayesian inferencing techniques described herein recovers the desired posterior using some data sampled from the environment we want to learn the dynamics from. In an embodiment, training is carried out using the aforementioned settings but instead of using a fixed friction coefficient, a new one is sampled from its respective distribution when a new episode starts.

Figure 13:
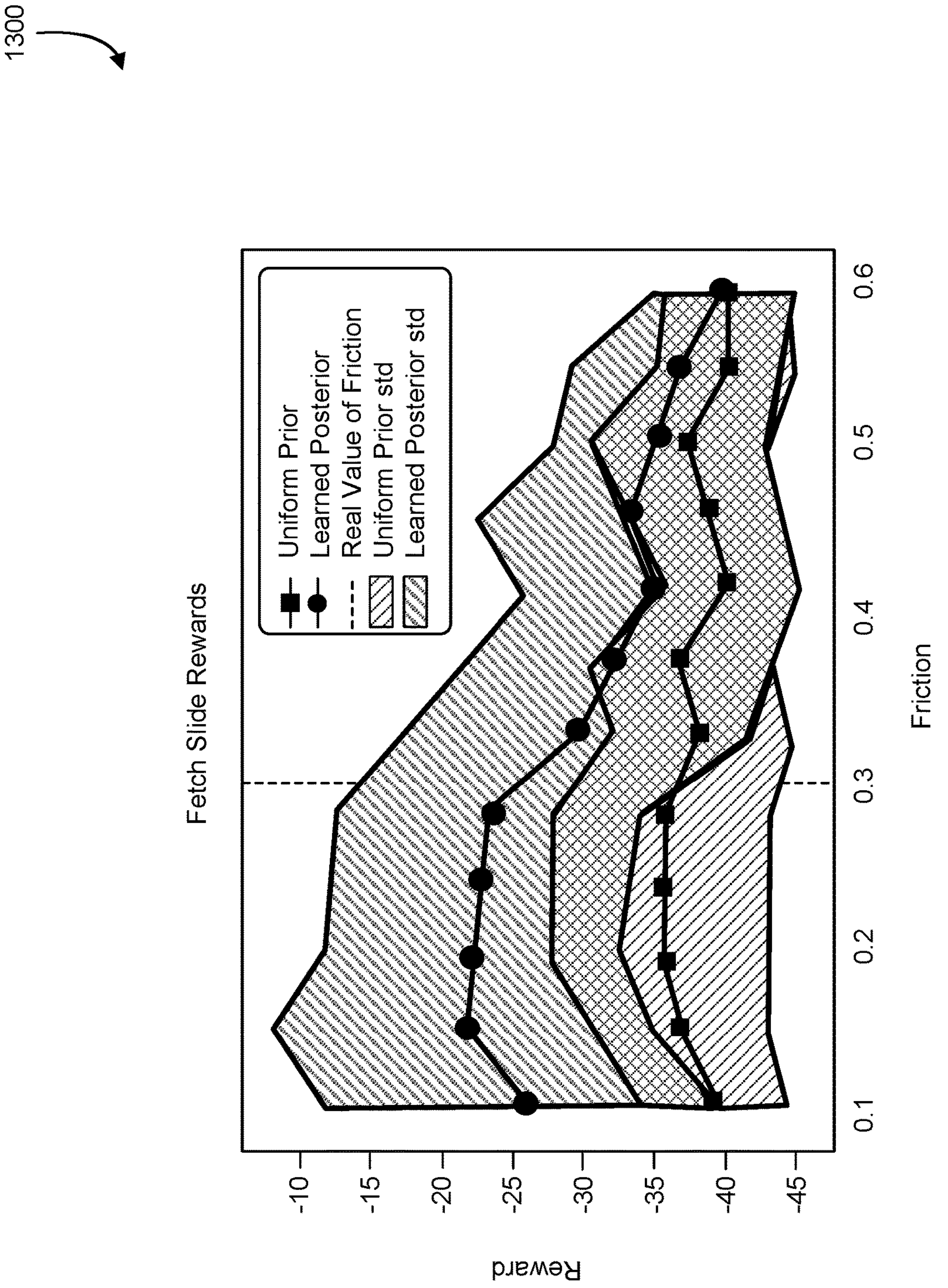
FIG. 13 illustrates an example of policies for the fetch-slide problem, in accordance with an embodiment.
Figure 14:
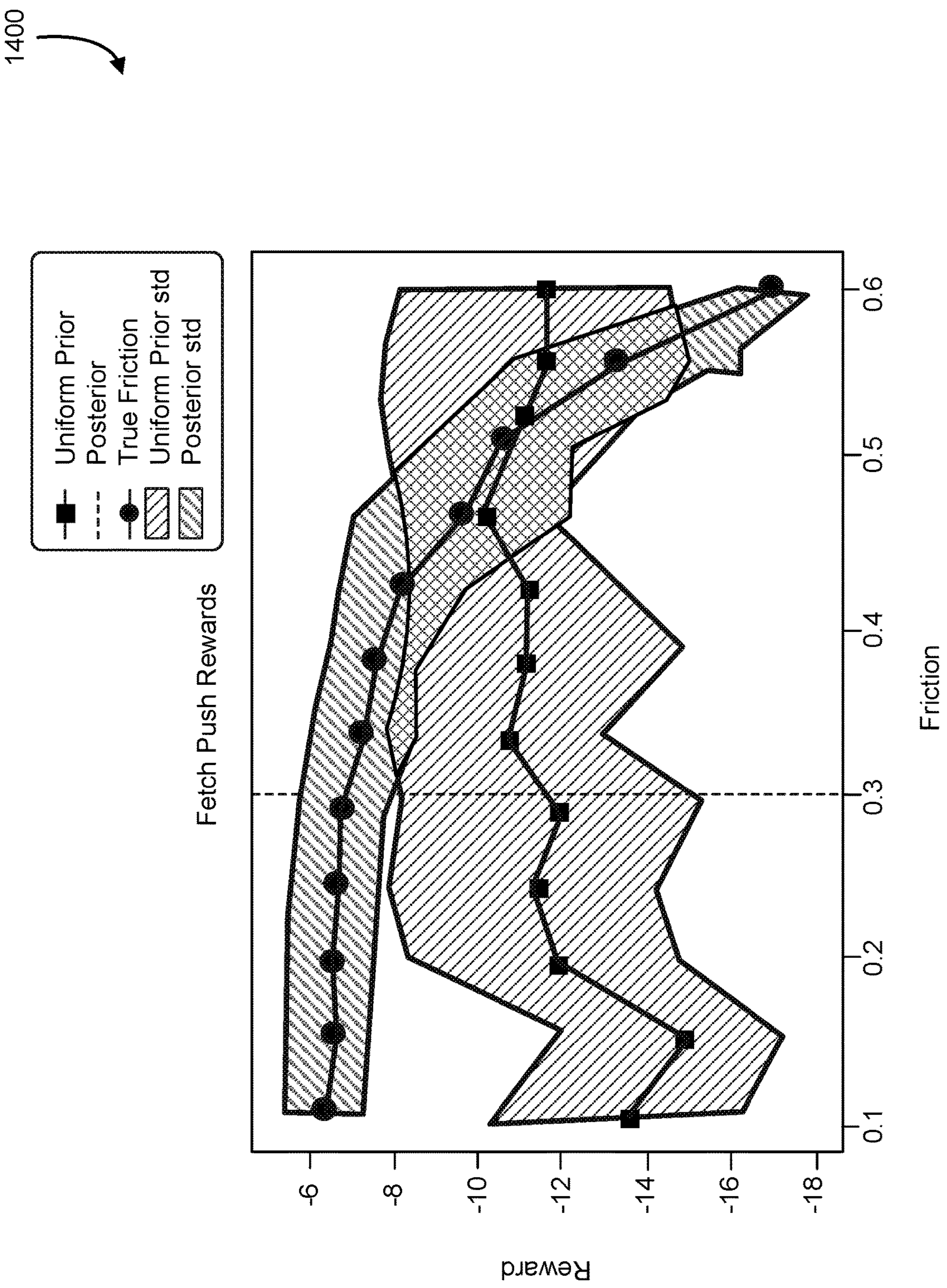
FIG. 14 illustrates an example of policies for the fetch-push problem, in accordance with an embodiment.

The results from both tasks, in accordance with an embodiment, are illustrated in FIGS. 13 and 14. FIG. 13 illustrates an example 1300 of policies for the fetch-slide problem. FIG. 14 illustrates an example 1400 of policies for the fetch-push problem, in accordance with an embodiment. In an embodiment, the uniform prior works remarkably well on the push task. In an embodiment, this happens because the robot has the opportunity to correct its trajectory if something goes wrong. In an embodiment, in the fetch-push problem, the robot is exposed to a wide range of scenarios involving different dynamics, and therefore the robot can then use the input of the environment to perform corrective actions and still be able to achieve the objective. In an embodiment, the slide task uses a uniform prior that causes the robot to achieve poor performance. In an embodiment, this happens because the robot has no option of correcting its trajectory. In an embodiment, the Bayesian inferencing techniques described herein are useful as they recover $\alpha$ distribution with very high density around the true parameter and, hence, lead to a better overall control policy.

In an embodiment, the present document presents a Bayesian treatment of robotics simulation parameters, combined with domain randomization for policy search. In an embodiment, the Bayesian inferencing techniques described herein uses a black-box generative model, or simulator, integrated into the framework. In an embodiment, prior distributions can also be provided and incorporated into the model to compute a multi-modal posterior over the parameters. In an embodiment, the method described herein performs comparably to other state-of-the-art likelihood-free approaches for Bayesian inference but is more stable to different initializations and is more stable across multiple runs when recovering the true posterior. In an embodiment, domain randomization with the posterior leads to more robust policies over multiple parameter values compared to policies trained on uniform prior randomization.

In an embodiment, the Bayesian inferencing techniques described herein can be applied to a large range of problems where simulators make use of a full set of parametrizations to represent reality. In an embodiment, the framework described herein can be integrated in many other problems involving simulators.

Figure 15:
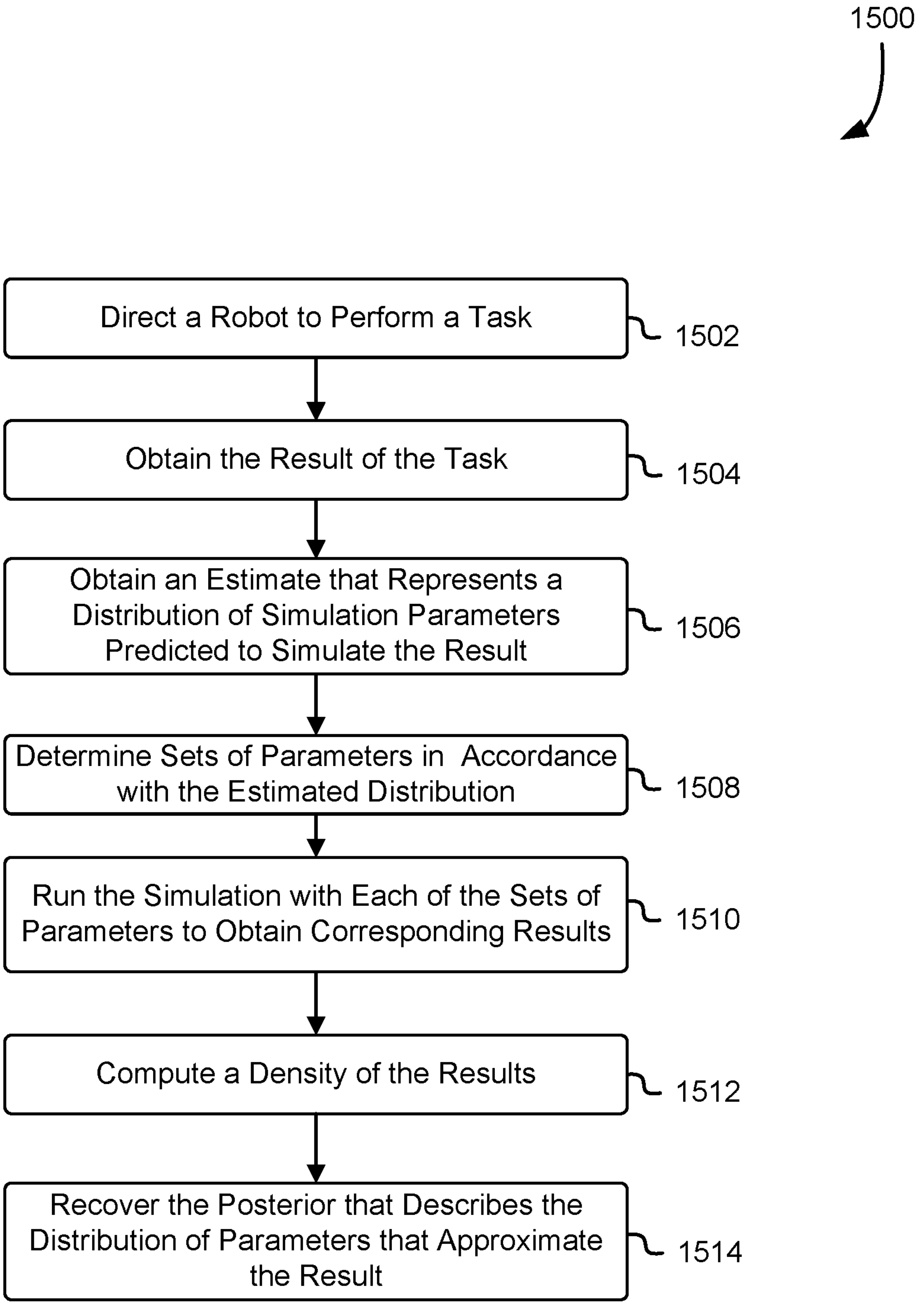
FIG. 15 illustrates an example of a process that, as a result of being performed by a processor of a computer system, causes the system to estimate a distribution of simulation parameters that, when applied to the simulation, cause the simulation to produce a desired result, in accordance with an embodiment.

FIG. 15 illustrates an example of a process 1500 that, as a result of being performed by a processor of a computer system, causes the Bayesian inferencing techniques described herein to estimate a distribution of simulation parameters that when applied to the simulation cause the simulation to produce a desired result, in accordance with an embodiment. In an embodiment, at block 1502, the computer system directs a robot such as a robotic arm to perform a task. In an embodiment, at block 1504, the computer system obtains the result of the task. In an embodiment, the result may be obtained via position sensors, cameras, motion detectors, or other sensors, and the result may represent the position or trajectory of an object or physical quantity or value. In an embodiment, at block 1506, the computer system obtains an estimate that represents a distribution of simulation parameters predicted to produce the obtained result. In an embodiment, the distribution is a constant value. In an embodiment, the distribution is a bounded constant value and zero everywhere else. In an embodiment, the distribution is obtained from a previous performance of the process 1500.

In an embodiment, at block 1508, the computer system generates sets of parameters for the simulator in accordance with the distribution obtained at 1506. In an embodiment, the simulator is run at block 1510 using each of the sets of determined parameters. In an embodiment, for each set of parameters, the simulator produces a corresponding result.

In an embodiment, the resulting parameter-result pairs are used to estimate a density at block 1512. In an embodiment, the density is modeled using a set of Fourier Features as described above. In an embodiment, at block 1514, the computer system uses the estimated density to compute a distribution of parameters predicted to produce the result observed at block 1504.

Figure 16:
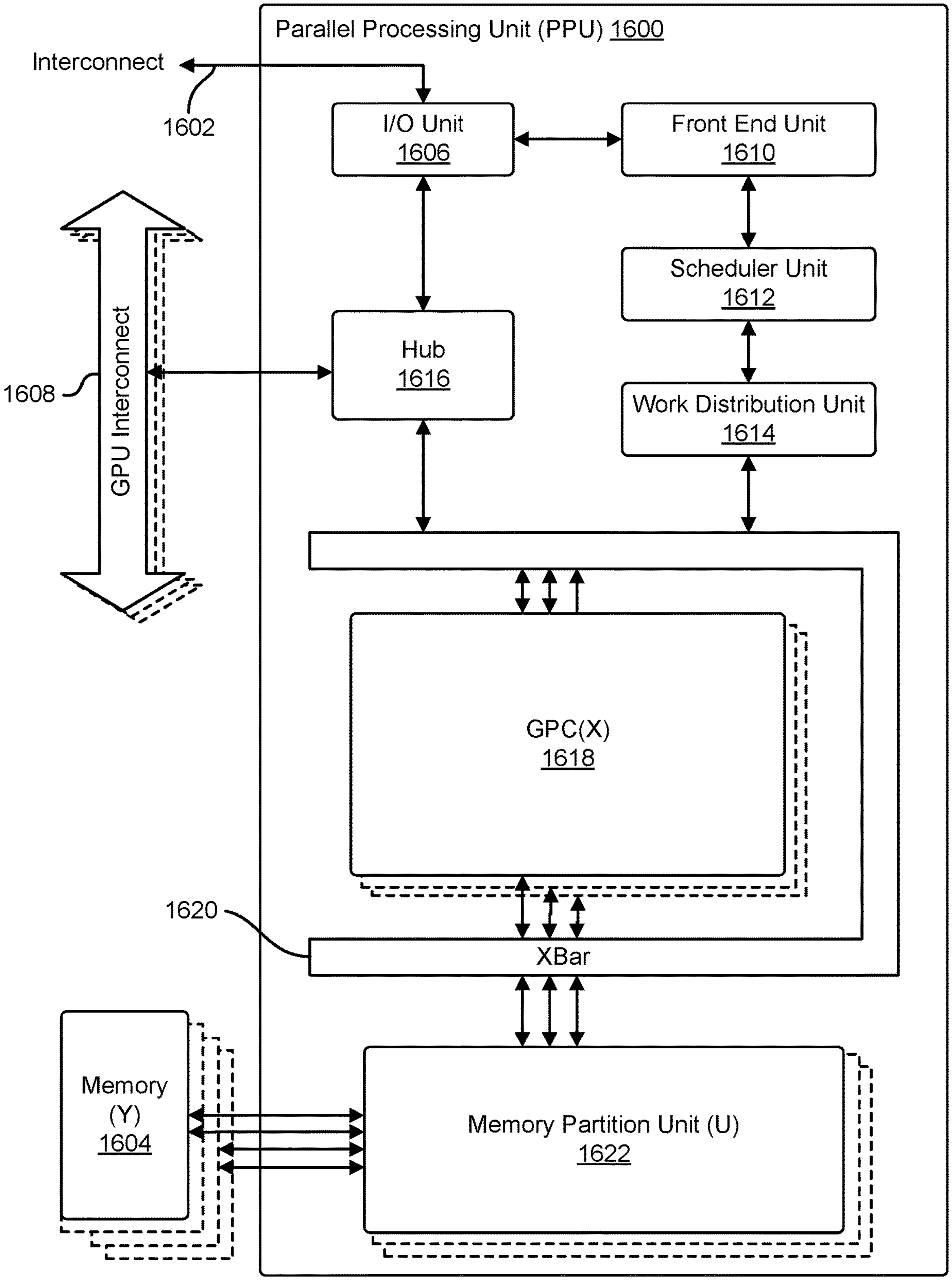
FIG. 16 illustrates an example of parallel processing unit ("PPU"), in accordance with an embodiment.

FIG. 16 illustrates a parallel processing unit ("PPU") 1600, in accordance with one embodiment. In an embodiment, the PPU 1600 is configured with machine-readable code that, if executed by the PPU, causes the PPU to perform some or all of processes and techniques described throughout this disclosure. In an embodiment, the PPU 1600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 1600. In an embodiment, the PPU 1600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 1600 is utilized to perform computations such as linear algebra operations and machine-learning operations. FIG. 16 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 1600 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 1600 includes an Input/Output ("I/O") unit 1606, a front-end unit 1610, a scheduler unit 1612, a work distribution unit 1614, a hub 1616, a crossbar ("Xbar") 1620, one or more general processing clusters ("GPCs") 1618, and one or more partition units 1622. In an embodiment, the PPU 1600 is connected to a host processor or other PPUs 1600 via one or more high-speed GPU interconnects 1608. In an embodiment, the PPU 1600 is connected to a host processor or other peripheral devices via an system bus 1602. In an embodiment, the PPU 1600 is connected to a local memory comprising one or more memory devices 1604. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 1608 may refer to a wire-based multi-lane communications link that is used by systems to scale and include one or more PPUs 1600 combined with one or more CPUs, supports cache coherence between the PPUs 1600 and CPUs, and CPU mastering. In an embodiment, data and/or commands are transmitted by the high-speed GPU interconnect 1608 through the hub 1616 to/from other units of the PPU 1600 such as one or more copy engines, video encoders, video decoders, power management units, and other components which may not be explicitly illustrated in FIG. 16.

In an embodiment, the I/O unit 1606 is configured to transmit and receive communications (e.g., commands, data) from a host processor (not illustrated in FIG. 16) over the system bus 1602. In an embodiment, the I/O unit 1606 communicates with the host processor directly via the system bus 1602 or through one or more intermediate devices such as a memory bridge. In an embodiment, the I/O unit 1606 may communicate with one or more other processors, such as one or more of the PPUs 1600 via the system bus 1602. In an embodiment, the I/O unit 1606 implements a Peripheral Component Interconnect Express ("PCIe") interface for communications over a PCIe bus. In an embodiment, the I/O unit 1606 implements interfaces for communicating with external devices.

In an embodiment, the I/O unit 1606 decodes packets received via the system bus 1602. In an embodiment, at least some packets represent commands configured to cause the PPU 1600 to perform various operations. In an embodiment, the I/O unit 1606 transmits the decoded commands to various other units of the PPU 1600 as specified by the commands. In an embodiment, commands are transmitted to the front-end unit 1610 and/or transmitted to the hub 1616 or other units of the PPU 1600 such as one or more copy engines, a video encoder, a video decoder, a power management unit, etc. (not explicitly illustrated in FIG. 16). In an embodiment, the I/O unit 1606 is configured to route communications between and among the various logical units of the PPU 1600.

In an embodiment, a program executed by the host processor encodes a command stream in a buffer that provides workloads to the PPU 1600 for processing. In an embodiment, a workload comprises instructions and data to be processed by those instructions. In an embodiment, the buffer is a region in a memory that is accessible (e.g., read/write) by both the host processor and the PPU 1600—the host interface unit may be configured to access the buffer in a system memory connected to the system bus 1602 via memory requests transmitted over the system bus 1602 by the I/O unit 1606. In an embodiment, the host processor writes the command stream to the buffer and then transmits a pointer to the start of the command stream to the PPU 1600 such that the front-end unit 1610 receives pointers to one or more command streams and manages the one or more streams, reading commands from the streams and forwarding commands to the various units of the PPU 1600.

In an embodiment, the front-end unit 1610 is coupled to a scheduler unit 1612 that configures the various GPCs 1618 to process tasks defined by the one or more streams. In an embodiment, the scheduler unit 1612 is configured to track state information related to the various tasks managed by the scheduler unit 1612 where the state information may indicate which GPC 1618 a task is assigned to, whether the task is active or inactive, a priority level associated with the task, and so forth. In an embodiment, the scheduler unit 1612 manages the execution of a plurality of tasks on the one or more GPCs 1618.

In an embodiment, the scheduler unit 1612 is coupled to a work distribution unit 1614 that is configured to dispatch tasks for execution on the GPCs 1618. In an embodiment, the work distribution unit 1614 tracks a number of scheduled tasks received from the scheduler unit 1612 and the work distribution unit 1614 manages a pending task pool and an active task pool for each of the GPCs 1618. In an embodiment, the pending task pool comprises a number of slots (e.g., 32 slots) that contain tasks assigned to be processed by a particular GPC 1618; the active task pool may comprise a number of slots (e.g., 4 slots) for tasks that are actively being processed by the GPCs 1618 such that as a GPC 1618 completes the execution of a task, that task is evicted from the active task pool for the GPC 1618 and one of the other tasks from the pending task pool is selected and scheduled for execution on the GPC 1618. In an embodiment, if an active task is idle on the GPC 1618, such as while waiting for a data dependency to be resolved, then the active task is evicted from the GPC 1618 and returned to the pending task pool while another task in the pending task pool is selected and scheduled for execution on the GPC 1618.

In an embodiment, the work distribution unit 1614 communicates with the one or more GPCs 1618 via XBar 1620. In an embodiment, the XBar 1620 is an interconnect network that couples many of the units of the PPU 1600 to other units of the PPU 1600 and can be configured to couple the work distribution unit 1614 to a particular GPC 1618. Although not shown explicitly, one or more other units of the PPU 1600 may also be connected to the XBar 1620 via the hub 1616.

The tasks are managed by the scheduler unit 1612 and dispatched to a GPC 1618 by the work distribution unit 1614. The GPC 1618 is configured to process the task and generate results. The results may be consumed by other tasks within the GPC 1618, routed to a different GPC 1618 via the XBar 1620, or stored in the memory 1604. The results can be written to the memory 1604 via the partition units 1622, which implement a memory interface for reading and writing data to/from the memory 1604. The results can be transmitted to another PPU 1600 or CPU via the high-speed GPU interconnect 1608. In an embodiment, the PPU 1600 includes a number U of partition units 1622 that is equal to the number of separate and distinct memory devices 1604 coupled to the PPU 1600. A partition unit 1622 will be described in more detail below in conjunction with FIG. 18.

In an embodiment, a host processor executes a driver kernel that implements an application programming interface ("API") that enables one or more applications executing on the host processor to schedule operations for execution on the PPU 1600. In an embodiment, multiple compute applications are simultaneously executed by the PPU 1600 and the PPU 1600 provides isolation, quality of service ("QoS"), and independent address spaces for the multiple compute applications. In an embodiment, an application generates instructions (e.g., in the form of API calls) that cause the driver kernel to generate one or more tasks for execution by the PPU 1600 and the driver kernel outputs tasks to one or more streams being processed by the PPU 1600. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, in conjunction with FIG. 18A.

Figure 17:
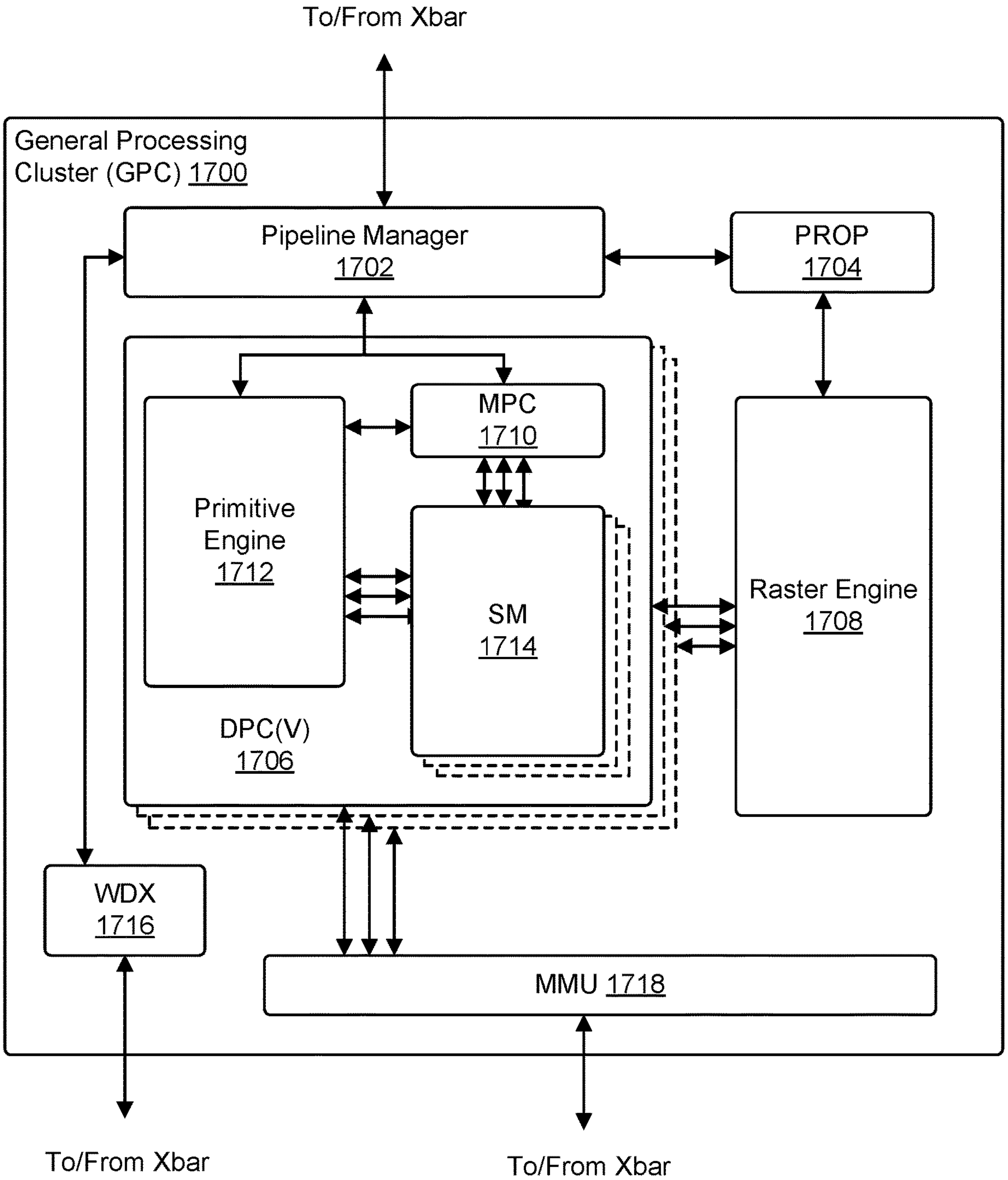
FIG. 17 illustrates an example of a general processing cluster ("GPC"), in accordance with one embodiment.

FIG. 17 illustrates a GPC 1700 such as the GPC illustrated of the PPU 1600 of FIG. 16, in accordance with one embodiment. In an embodiment, each GPC 1700 includes a number of hardware units for processing tasks and each GPC 1700 includes a pipeline manager 1702, a pre-raster operations unit ("PROP") 1704, a raster engine 1708, a work distribution crossbar ("WDX") 1716, a memory management unit ("MMU") 1718, one or more Data Processing Clusters ("DPCs") 1706, and any suitable combination of parts. It will be appreciated that the GPC 1700 of FIG. 17 may include other hardware units in lieu of or in addition to the units shown in FIG. 17.

In an embodiment, the operation of the GPC 1700 is controlled by the pipeline manager 1702. The pipeline manager 1702 manages the configuration of the one or more DPCs 1706 for processing tasks allocated to the GPC 1700. In an embodiment, the pipeline manager 1702 configures at least one of the one or more DPCs 1706 to implement at least a portion of a graphics rendering pipeline. In an embodiment, a DPC 1706 is configured to execute a vertex shader program on the programmable streaming multiprocessor ("SM") 1714. The pipeline manager 1702 is configured to route packets received from a work distribution to the appropriate logical units within the GPC 1700, in an embodiment, and some packets may be routed to fixed function hardware units in the PROP 1704 and/or raster engine 1708 while other packets may be routed to the DPCs 1706 for processing by the primitive engine 1712 or the SM 1714. In an embodiment, the pipeline manager 1702 configures at least one of the one or more DPCs 1706 to implement a neural network model and/or a computing pipeline.

The PROP unit 1704 is configured, in an embodiment, to route data generated by the raster engine 1708 and the DPCs 1706 to a Raster Operations ("ROP") unit in the memory partition unit, described in more detail above. In an embodiment, the PROP unit 1704 is configured to perform optimizations for color blending, organize pixel data, perform address translations, and more. The raster engine 1708 includes a number of fixed function hardware units configured to perform various raster operations, in an embodiment, and the raster engine 1708 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1708 comprises fragments to be processed by any suitable entity such as by a fragment shader implemented within a DPC 1706.

In an embodiment, each DPC 1706 included in the GPC 1700 comprises an M-Pipe Controller ("MPC") 1710; a primitive engine 1712; one or more SMs 1714; and any suitable combination thereof. In an embodiment, the MPC 1710 controls the operation of the DPC 1706, routing packets received from the pipeline manager 1702 to the appropriate units in the DPC 1706. In an embodiment, packets associated with a vertex are routed to the primitive engine 1712, which is configured to fetch vertex attributes associated with the vertex from memory; in contrast, packets associated with a shader program may be transmitted to the SM 1714.

In an embodiment, the SM 1714 comprises a programmable streaming processor that is configured to process tasks represented by a number of threads. In an embodiment, the SM 1714 is multi-threaded and configured to execute a plurality of threads (e.g., 32 threads) from a particular group of threads concurrently and implements a SIMID (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1714 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1714 is described in more detail below.

In an embodiment, the MMU 1718 provides an interface between the GPC 1700 and the memory partition unit and the MMU 1718 provides translation of virtual addresses into physical addresses, memory protection, and arbitration of memory requests. In an embodiment, the MMU 1718 provides one or more translation lookaside buffers ("TLBs") for performing translation of virtual addresses into physical addresses in memory.

Figure 18:
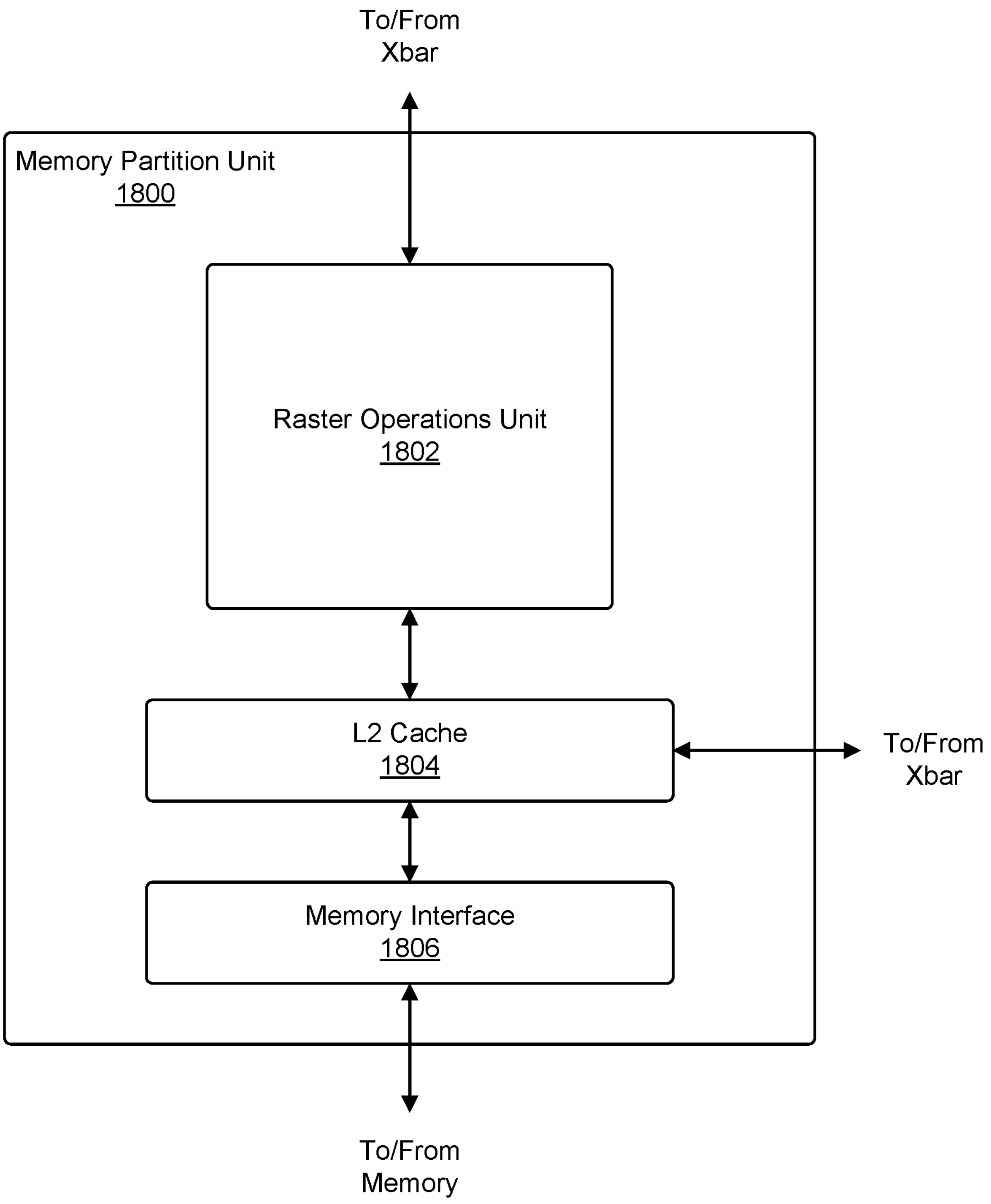
FIG. 18 illustrates an example of a memory partition unit, in accordance with one embodiment.

FIG. 18 illustrates a memory partition unit of a PPU, in accordance with one embodiment. In an embodiment, the memory partition unit 1800 includes a Raster Operations ("ROP") unit 1802; a level two ("L2") cache 1804; a memory interface 1806; and any suitable combination thereof. The memory interface 1806 is coupled to the memory. Memory interface 1806 may implement 32, 64, 128, 1024-bit data buses, or the like, for high-speed data transfer. In an embodiment, the PPU incorporates U memory interfaces 1806, one memory interface 1806 per pair of partition units 1800, where each pair of partition units 1800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 1806 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 1800 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 1608 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 1800 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 16 or other system memory is fetched by the memory partition unit 1800 and stored in the L2 cache 1804, which is located on-chip and is shared between the various GPCs, in accordance with one embodiment. Each memory partition unit 1800, in an embodiment, includes at least a portion of the L2 cache 1760 associated with a corresponding memory device. In an embodiment, lower level caches are implemented in various units within the GPCs. In an embodiment, each of the SMs 1840 may implement a level one ("L1") cache wherein the L1 cache is private memory that is dedicated to a particular SM 1840 and data from the L2 cache 1804 is fetched and stored in each of the L1 caches for processing in the functional units of the SMs 1840. In an embodiment, the L2 cache 1804 is coupled to the memory interface 1806 and the XBar 1620.

The ROP unit 1802 performs graphics raster operations related to pixel color, such as color compression, pixel blending, and more, in an embodiment. The ROP unit 1802, in an embodiment, implements depth testing in conjunction with the raster engine 1825, receiving a depth for a sample location associated with a pixel fragment from the culling engine of the raster engine 1825. In an embodiment, the depth is tested against a corresponding depth in a depth buffer for a sample location associated with the fragment. In an embodiment, if the fragment passes the depth test for the sample location, then the ROP unit 1802 updates the depth buffer and transmits a result of the depth test to the raster engine 1825. It will be appreciated that the number of partition units 1800 may be different than the number of GPCs and, therefore, each ROP unit 1802 can, in an embodiment, be coupled to each of the GPCs. In an embodiment, the ROP unit 1802 tracks packets received from the different GPCs and determines which that a result generated by the ROP unit 1802 is routed to through the Xbar.

Figure 19:
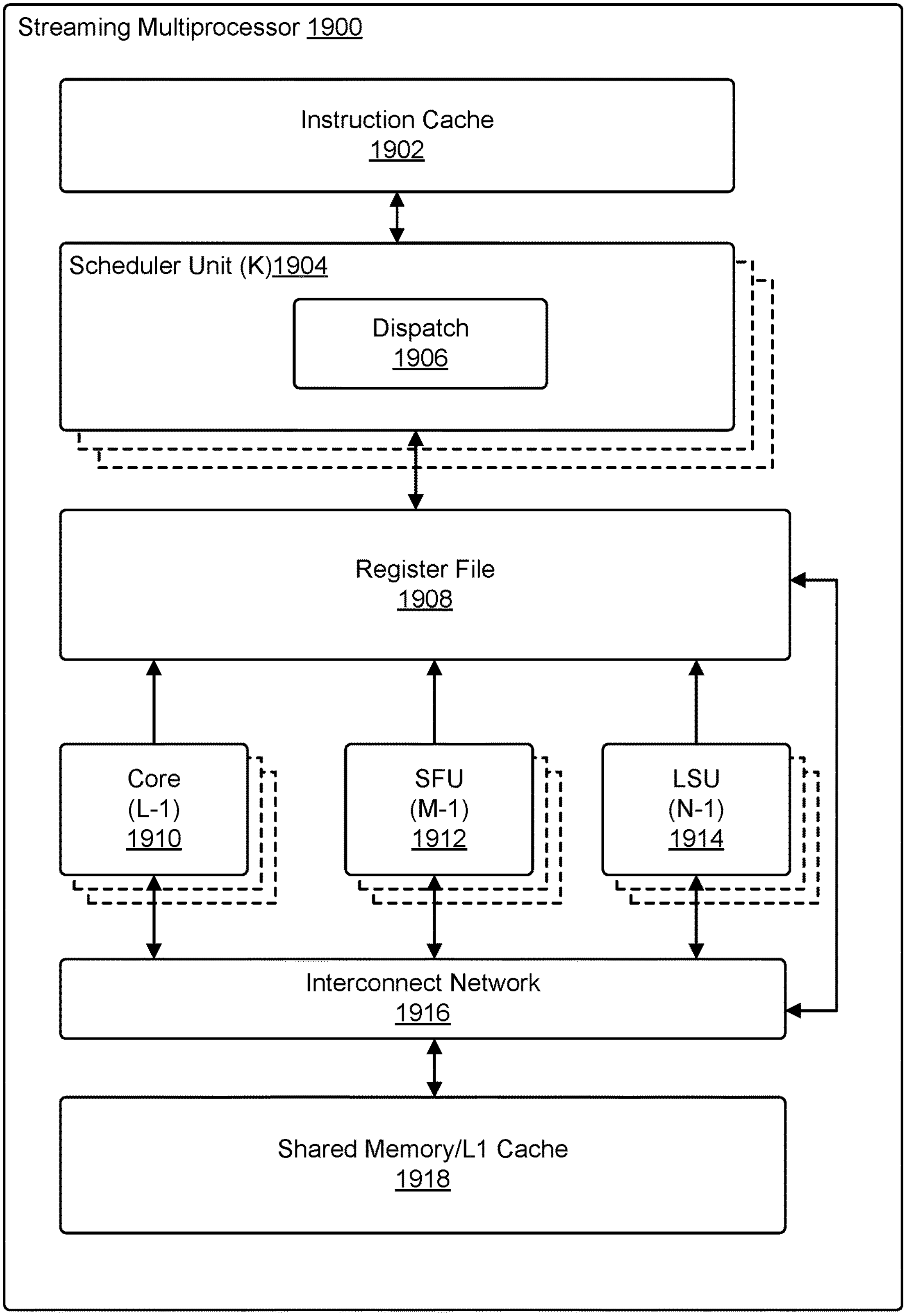
FIG. 19 illustrates an example of a streaming multiprocessor, in accordance with one embodiment.

FIG. 19 illustrates a streaming multi-processor such as the streaming multi-processor of FIG. 17, in accordance with one embodiment. In an embodiment, the SM 1900 includes: an instruction cache 1902; one or more scheduler units 1904; a register file 1908; one or more processing cores 1910; one or more special function units ("SFUs") 1912; one or more load/store units ("LSUs") 1914; an interconnect network 1916; a shared memory/L1 cache 1918; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1900. In an embodiment, the scheduler unit 1904 receives the tasks from the work distribution unit and manages instruction scheduling for one or more thread blocks assigned to the SM 1900. In an embodiment, the scheduler unit 1904 schedules thread blocks for execution as warps of parallel threads, wherein each thread block is allocated at least one warp. In an embodiment, each warp executes threads. In an embodiment, the scheduler unit 1904 manages a plurality of different thread blocks, allocating the warps to the different thread blocks and then dispatching instructions from the plurality of different cooperative groups to the various functional units (e.g., cores 1910, SFUs 1912, and LSUs 1914) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1906 is configured to transmit instructions to one or more of the functional units and the scheduler unit 1904 includes two dispatch units 1906 that enable two different instructions from the same warp to be dispatched during each clock cycle. In an embodiment, each scheduler unit 1904 includes a single dispatch unit 1906 or additional dispatch units 1906.

Each SM 1900, in an embodiment, includes a register file 1908 that provides a set of registers for the functional units of the SM 1900. In an embodiment, the register file 1908 is divided between each of the functional units such that each functional unit is allocated a dedicated portion of the register file 1908. In an embodiment, the register file 1908 is divided between the different warps being executed by the SM 1900 and the register file 1908 provides temporary storage for operands connected to the data paths of the functional units. In an embodiment, each SM 1900 comprises a plurality of L processing cores 1910. In an embodiment, the SM 1900 includes a large number (e.g., 128 or more) of distinct processing cores 1910. Each core 1910, in an embodiment, includes a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1910 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1910. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and Bare 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1900 comprises M SFUs 1912 that perform special functions (e.g., attribute evaluation, reciprocal square root, and the like). In an embodiment, the SFUs 1912 include a tree traversal unit configured to traverse a hierarchical tree data structure. In an embodiment, the SFUs 1912 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1900. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1900 includes two texture units.

Each SM 1900 comprises N LSUs 1854 that implement load and store operations between the shared memory/L1 cache 1918 and the register file 1908, in an embodiment. Each SM 1900 includes an interconnect network 1916 that connects each of the functional units to the register file 1908 and the LSU 1914 to the register file 1908, shared memory/L1 cache 1918 in an embodiment. In an embodiment, the interconnect network 1916 is a crossbar that can be configured to connect any of the functional units to any of the registers in the register file 1908 and connect the LSUs 1914 to the register file and memory locations in shared memory/L1 cache 1918.

The shared memory/L1 cache 1918 is an array of on-chip memory that allows for data storage and communication between the SM 1900 and the primitive engine and between threads in the SM 1900 in an embodiment. In an embodiment, the shared memory/L1 cache 1918 comprises 128 KB of storage capacity and is in the path from the SM 1900 to the partition unit. The shared memory/L1 cache 1918, in an embodiment, is used to cache reads and writes. One or more of the shared memory/L1 cache 1918, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1918 enables the shared memory/L1 cache 1918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1900 to execute the program and perform calculations, shared memory/L1 cache 1918 to communicate between threads, and the LSU 1914 to read and write global memory through the shared memory/L1 cache 1918 and the memory partition unit, in accordance with one embodiment. In an embodiment, when configured for general purpose parallel computation, the SM 1900 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 20:
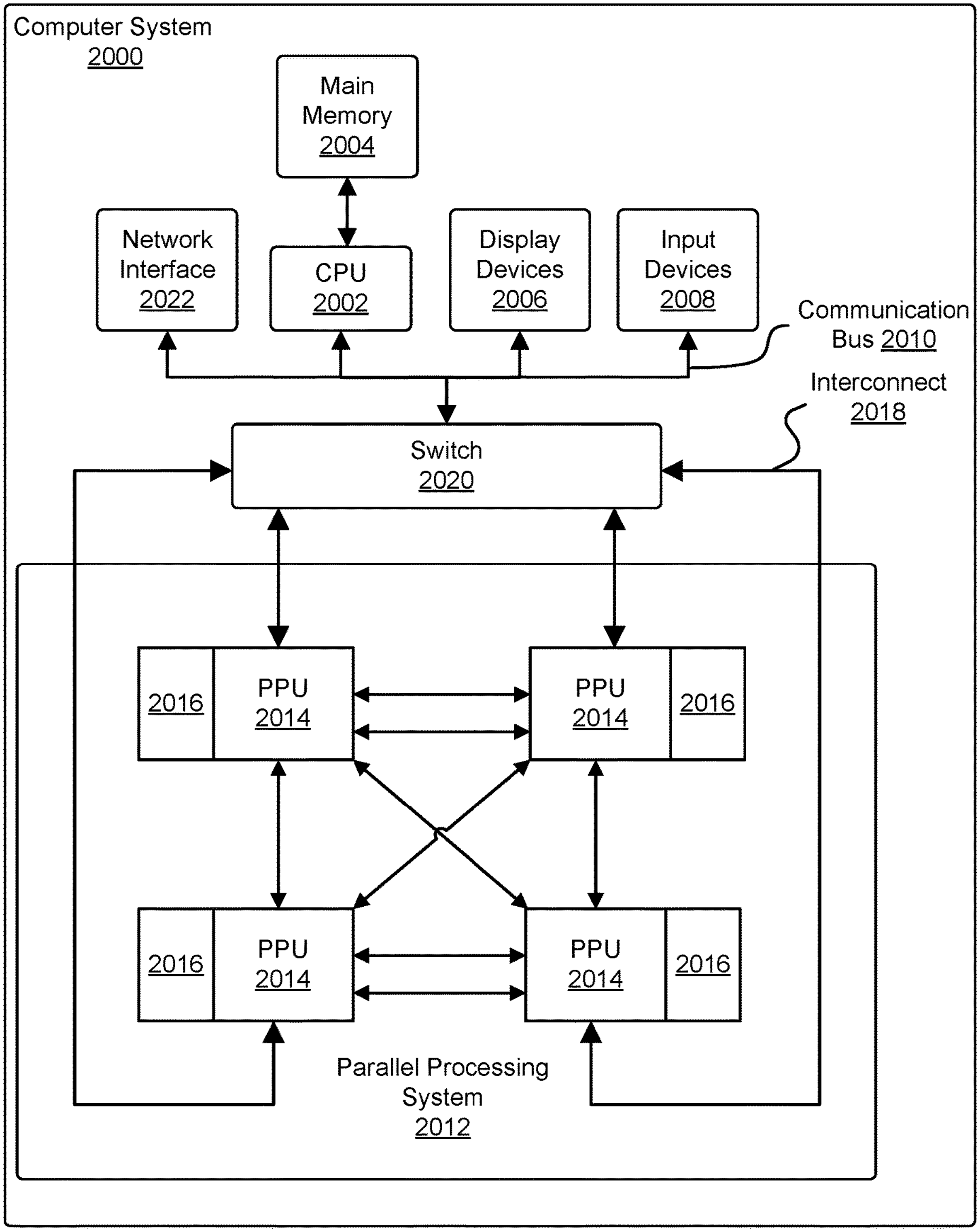
FIG. 20 illustrates a computer system in which the various examples can be implemented, in accordance with one embodiment.

FIG. 20 illustrates a computer system 2000 in which the various architecture and/or functionality can be implemented, in accordance with one embodiment. The computer system 2000, in an embodiment, is configured to implement various processes and methods described throughout this disclosure.

In an embodiment, the computer system 2000 comprises at least one central processing unit 2002 that is connected to a communication bus 2010 implemented using any suitable protocol, such as PCI (Peripheral Component Interconnect), PCI-Express, AGP (Accelerated Graphics Port), HyperTransport, or any other bus or point-to-point communication protocol(s). In an embodiment, the computer system 2000 includes a main memory 2004 and control logic (e.g., implemented as hardware, software, or a combination thereof) and data are stored in the main memory 2004 which may take the form of random access memory ("RAM"). In an embodiment, a network interface subsystem 2022 provides an interface to other computing devices and networks for receiving data from and transmitting data to other systems from the computer system 2000.

The computer system 2000, in an embodiment, includes input devices 2008, the parallel processing system 2012, and display devices 2006 which can be implemented using a conventional CRT (cathode ray tube), LCD (liquid crystal display), LED (light emitting diode), plasma display, or other suitable display technologies. In an embodiment, user input is received from input devices 2008 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") 2002 and bus implementation. Of course, the various modules may also be situated separately or in various combinations of semiconductor platforms per the desires of the user.

In an embodiment, computer programs in the form of machine-readable executable code or computer control logic algorithms are stored in the main memory 2004 and/or secondary storage. Computer programs, if executed by one or more processors, enable the system 2000 to perform various functions in accordance with one embodiment. The main memory 2004, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 2002; parallel processing system 2012; an integrated circuit capable of at least a portion of the capabilities of both the central processor 2002; the parallel processing system 2012; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 2000 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 2012 includes a plurality of PPUs 2014 and associated memories 2016. In an embodiment, the PPUs are connected to a host processor or other peripheral devices via an interconnect 2018 and a switch 2020 or multiplexer. In an embodiment, the parallel processing system 2012 distributes computational tasks across the PPUs 2014 which can be parallelizable—for example, as part of the distribution of computational tasks across multiple GPU thread blocks. In an embodiment, memory is shared and accessible (e.g., for read and/or write access) across some or all of the PPUs 2014, although such shared memory may incur performance penalties relative to the use of local memory and registers resident to a PPU. In an embodiment, the operation of the PPUs 2014 is synchronized through the use of a command such as _syncthreads( ) which requires all threads in a block (e.g., executed across multiple PPUs 2014) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A"computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more processors, comprising circuitry to:

obtain one or more Fourier-transformed representations computed for one or more measured results of a robotic device performing a task in the physical world;

simulate a virtual robotic device performing the task using one or more simulation parameters selected based on the one or more Fourier-transformed representations;

generate one or more multimodal probability distributions based, at least in part, on one or more results of the simulation; and cause, using a controller of the robotic device and based at least on a random sampling of the one or more multimodal probability distributions, the robotic device to repeat at least one performance of the task in the physical world.

2. The one or more processors of claim 1, wherein the one or more Fourier-transformed representations model a density function based, at least in part, on results of one or more additional simulations.

3. The one or more processors of claim 2, wherein the density function is parameterized as a set of Fourier features.

4. The one or more processors of claim 1, wherein the one or more multimodal probability distributions are to be generated further based, at least in part, on one or more additional simulations performed with a set of parameters chosen in accordance with a predicted prior distribution of parameters.

5. The one or more processors of claim 1, wherein the one or more multimodal probability distributions, as a result of being applied to a simulator, are to cause the simulator to approximate the one or more measured results with greater accuracy.

6. The one or more processors of claim 5, wherein the simulator is to simulate the virtual robotic device performing the task using the one or more selected simulation parameters.

7. The one or more processors of claim 5, wherein applying the one or more multimodal probability distributions to the simulator includes randomizing, by the simulator, over the one or more simulation parameters based, at least in part, on the one or more multimodal probability distributions.

8. The one or more processors of claim 1, wherein the circuitry is to cause the one or more multimodal probability distributions to be updated to predict a result of the robotic device performing the task.

9. The one or more processors of claim 1, wherein the one or more multimodal probability distributions comprise one or more mixtures of Gaussian distributions.

10. A system, comprising one or more processors to:

obtain one or more Fourier-transformed representations computed for one or more measured results of a robotic device performing a task in the physical world;

simulate a virtual robotic device performing the task using one or more simulation parameters selected based on the one or more Fourier-transformed representations;

generate one or more multimodal probability distributions based, at least in part, on one or more results of the simulation; and cause, using a controller of the robotic device and based at least on a random sampling of the one or more multimodal probability distributions, the robotic device to repeat at least one performance of the task in the physical world.

11. The system of claim 10, wherein the one or more Fourier-transformed representations model a density function based, at least in part, on results of one or more additional simulations.

12. The system of claim 11, wherein:

the density function is modeled as a set of Fourier features; and the set of Fourier features is selected using Halton sequences.

13. The system of claim 11, wherein the density function is modeled as a set of randomly selected Fourier features.

14. The system of claim 10, wherein the one or more multimodal probability distributions are to be used to estimate a second distribution of parameter values, and wherein the one or more multimodal probability distributions are to be generated further based, at least in part, on one or more additional simulations performed by a simulator using sets of parameters chosen in accordance with a first distribution of parameter values, the first distribution of parameter values generated prior to the second distribution of parameter values.

15. The system of claim 14, wherein the simulator is to produce results for individual parameter sets in the sets of parameters.

16. The system of claim 10, wherein the one or more multimodal probability distributions are to model a non-Gaussian distribution that indicates a plurality of parameter solutions.

17. The system of claim 10, wherein the one or more multimodal probability distributions are to be applied to a simulator to improve an accuracy thereof.

18. A non-transitory computer-readable storage medium having stored thereon a set of instructions that, as a result of being performed by one or more processors, cause the one or more processors to at least:

obtain one or more Fourier-transformed representations computed for one or more measured results of a robotic device performing a task in the physical world;

simulate a virtual robotic device performing the task using one or more simulation parameters selected based on the one or more Fourier-transformed representations;

generate one or more multimodal probability distributions based, at least in part, on one or more results of the simulation; and cause, using a controller of the robotic device and based at least on a random sampling of the one or more multimodal probability distributions, the robotic device to repeat at least one performance of the task in the physical world.

19. The non-transitory computer-readable storage medium of claim 18, wherein the one or more Fourier-transformed representations model a density based, at least in part, on parameter-result pairs produced by one or more additional simulations.

20. The non-transitory computer-readable storage medium of claim 19, wherein the density is modeled as a set of Fourier features.

21. The non-transitory computer-readable storage medium of claim 20, wherein the set of Fourier features is determined in accordance with a quasi Monte Carlo strategy.

22. The non-transitory computer-readable storage medium of claim 18, wherein the instructions, as a result of being performed by the one or more processors, further cause the one or more processors to use additional simulations selected in accordance with the one or more multimodal probability distributions to produce a refined distribution of the one or more simulation parameters.

23. The non-transitory computer-readable storage medium of claim 18, wherein the one or more multimodal probability distributions are to be generated further based, at least in part, on one or more additional simulations performed with a set of parameters chosen in accordance with a bounded uniform prior.

24. The non-transitory computer-readable storage medium of claim 18, wherein the one or more multimodal probability distributions are to be generated further based, at least in part, on one or more additional simulations performed with a set of parameters chosen in accordance with a Gaussian prior.

25. The non-transitory computer-readable storage medium of claim 18, wherein the one or more multimodal probability distributions are to improve an accuracy of a simulator as a result of being applied to the simulator.

* * * * *